United States Patent [19]
Watanabe et al.

[11] Patent Number: 5,598,712
[45] Date of Patent: Feb. 4, 1997

[54] LATENT HEAT ACCUMULATION SYSTEM

[75] Inventors: Yutaka Watanabe; Takayuki Hachimonji, both of Yokohama; Katsuya Yamashita; Sanae Sekita, both of Tokyo; Tsuyoshi Noma, Yokohama, all of Japan

[73] Assignee: Kabushiki Kaisha Toshiba, Kawasaki, Japan

[21] Appl. No.: 518,580

[22] Filed: Aug. 15, 1995

Related U.S. Application Data

[63] Continuation-in-part of Ser. No. 417,470, Apr. 5, 1995, Pat. No. 5,481,882, which is a continuation of Ser. No. 22,556, Feb. 25, 1993, abandoned.

[30] Foreign Application Priority Data

| Feb. 28, 1992 | [JP] | Japan | 4-043720 |
| Mar. 5, 1992 | [JP] | Japan | 4-048155 |
| Apr. 1, 1992 | [JP] | Japan | 4-078112 |

[51] Int. Cl.$^6$ .................................................. F25D 3/00
[52] U.S. Cl. .................... 62/59; 62/70; 62/344; 62/534; 165/104.17; 165/104.25
[58] Field of Search .................... 62/59, 70, 344, 62/66, 534; 165/104.17, 104.22, 104.25, 902

[56] References Cited

U.S. PATENT DOCUMENTS

| 3,390,537 | 7/1968 | Callen | 62/344 |
| 4,596,120 | 6/1986 | Knodel et al. | 165/104.17 X |
| 4,840,652 | 6/1989 | Simon et al. | 62/534 |

FOREIGN PATENT DOCUMENTS

| 0147095 | 8/1985 | Japan | 165/104.17 |
| 1-147234 | 6/1989 | Japan | 62/59 |
| 1-203832 | 8/1989 | Japan | 62/59 |
| 1-244225 | 9/1989 | Japan | 62/59 |
| 3-59335 | 3/1991 | Japan | 62/59 |
| 0129228 | 6/1991 | Japan | 62/59 |

OTHER PUBLICATIONS

Proceedings of The 2nd International Conference on Multiphase Flow '95-Kyoto, Apr. 3–7, 1995, vol. 3, "Experimental Study on Frazil Ice Formation and Characteristics of Direct Heat Transfer Between Two Liquids", by Y. Watanabe, et al., pp. EN25–EN31.

*Primary Examiner*—John Rivell
*Assistant Examiner*—Christopher Atkinson
*Attorney, Agent, or Firm*—Oblon, Spivak, McClelland, Maier & Neustadt, P.C.

[57] ABSTRACT

A latent heat accumulation system having a transfer mechanism comprises a production tank in which water is put in direct contact with an antifreezing liquid which does not combine with the water, has a specific gravity greater than that of the water and is cooled to a preset temperature level, thus producing ice particles, a recovery section, formed at a lower part of the production tank, for recovering the antifreezing liquid descending within the production tank, an upward pipe, connected to the production tank, for guiding upward a two-phase stream of the water and ice particles within the production tank, a transfer pipe, connected to the upward pipe, for transferring the two-phase stream to a specified place, a reservoir tank for storing the two-phase stream transferred via the transfer pipe, a water circulation system for draining the water from the reservoir tank and introducing the drained water into the production tank, and an antifreezing fluid circulation system for cooling the antifreezing fluid recovered by the recovery section and feeding the cooled antifreezing fluid into the production tank for bringing the antifreezing fluid into direct contact with the water.

11 Claims, 23 Drawing Sheets

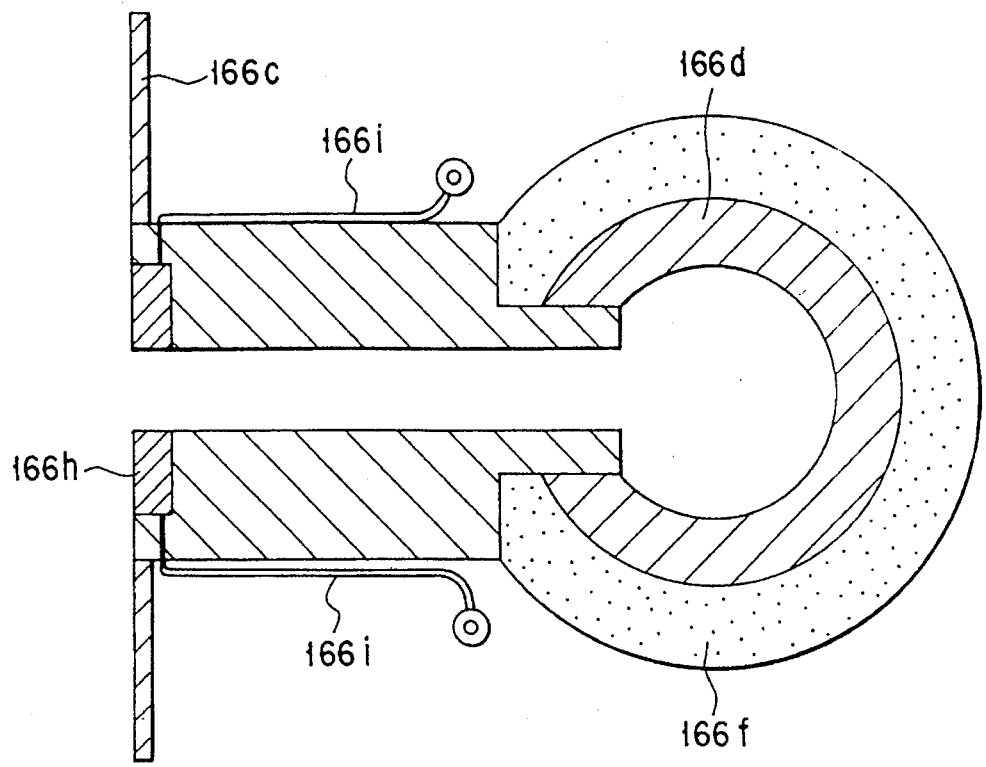
F I G. 16
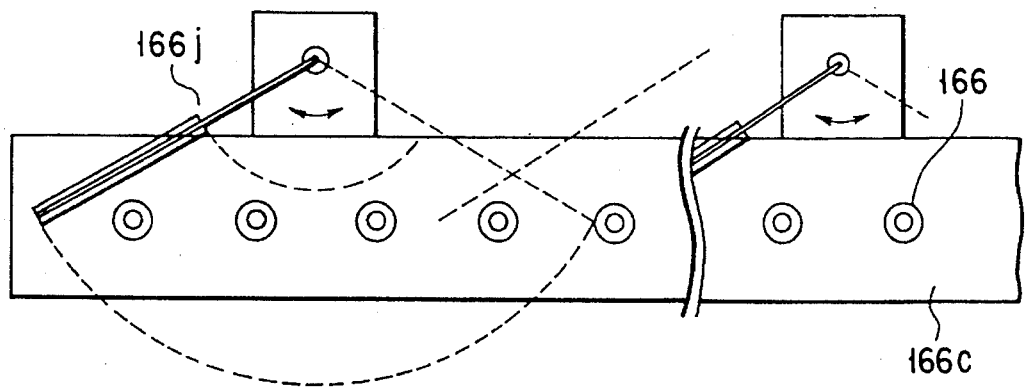
F I G. 17

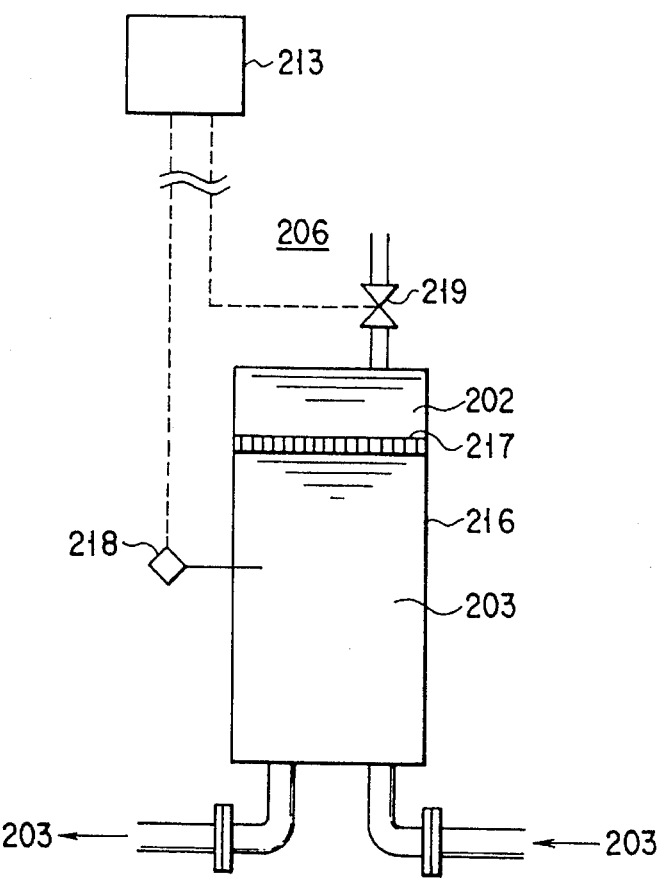
F I G. 19
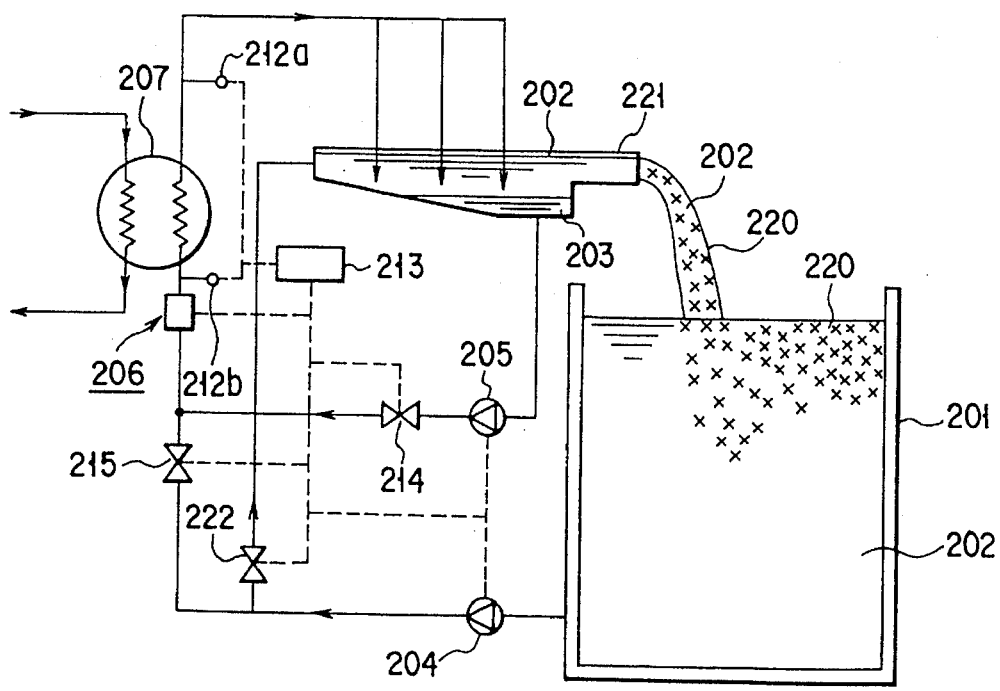
F I G. 20

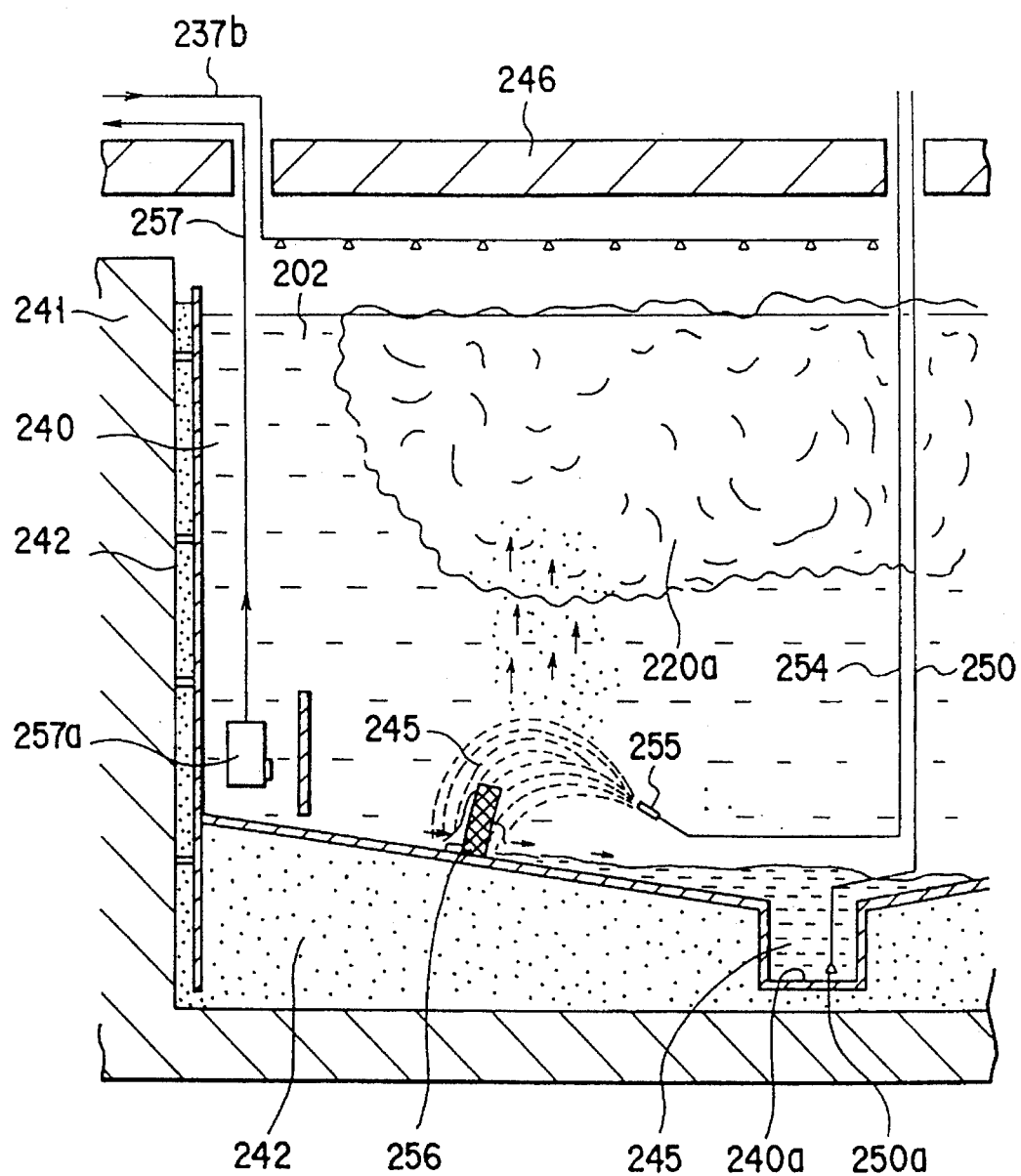
F I G. 22

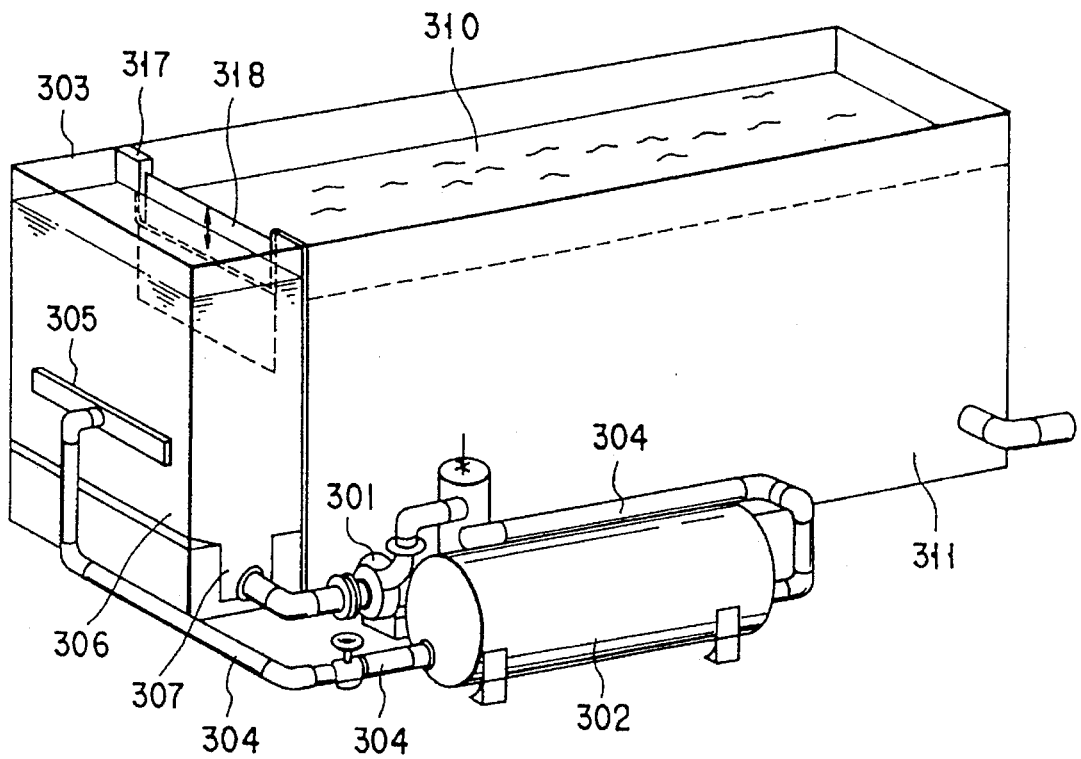
F I G. 25
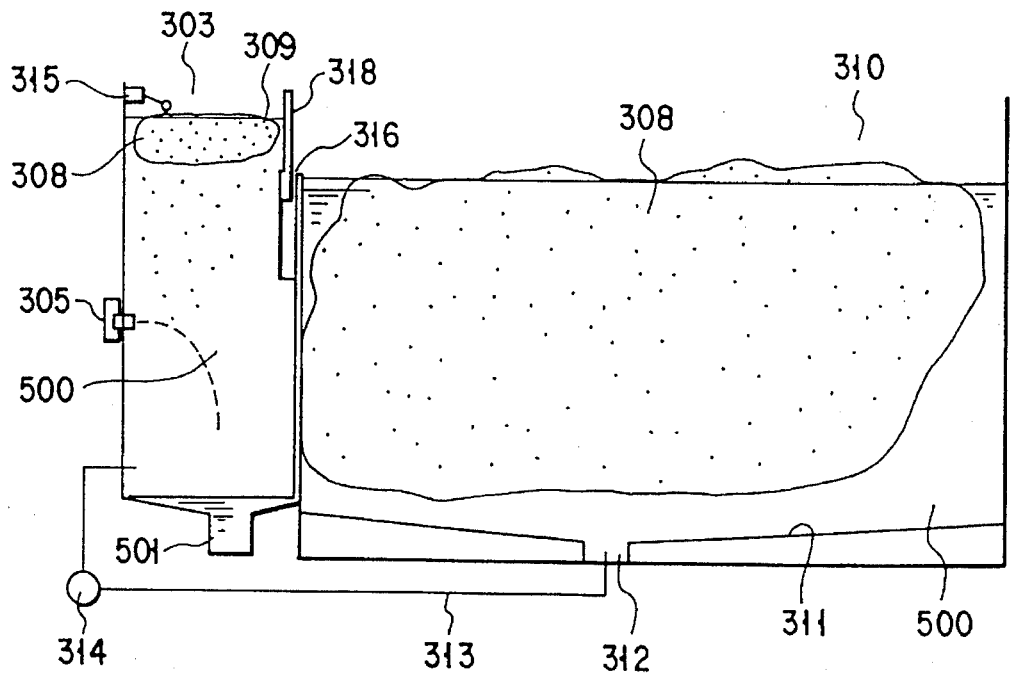
F I G. 26

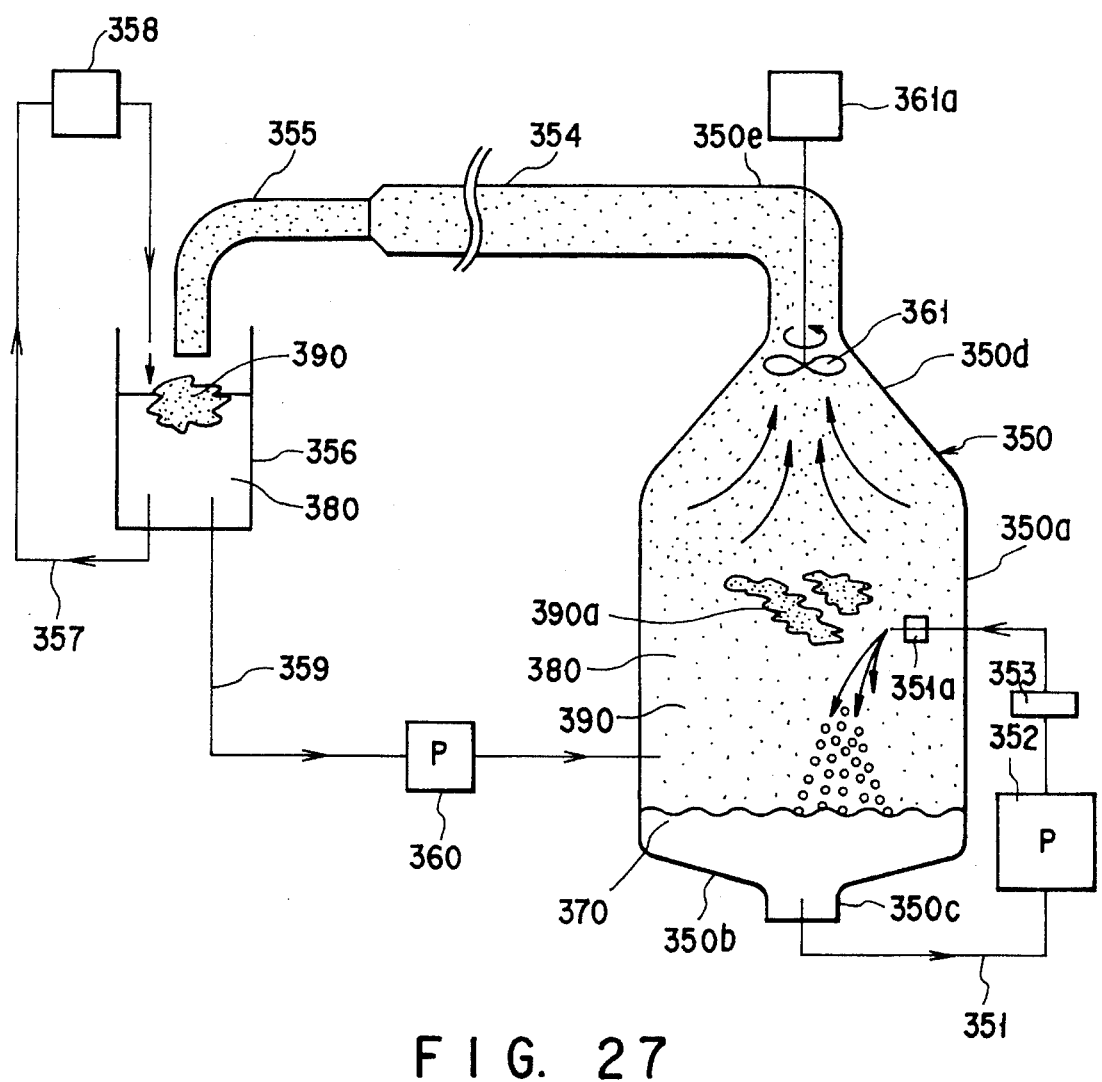
F I G. 27

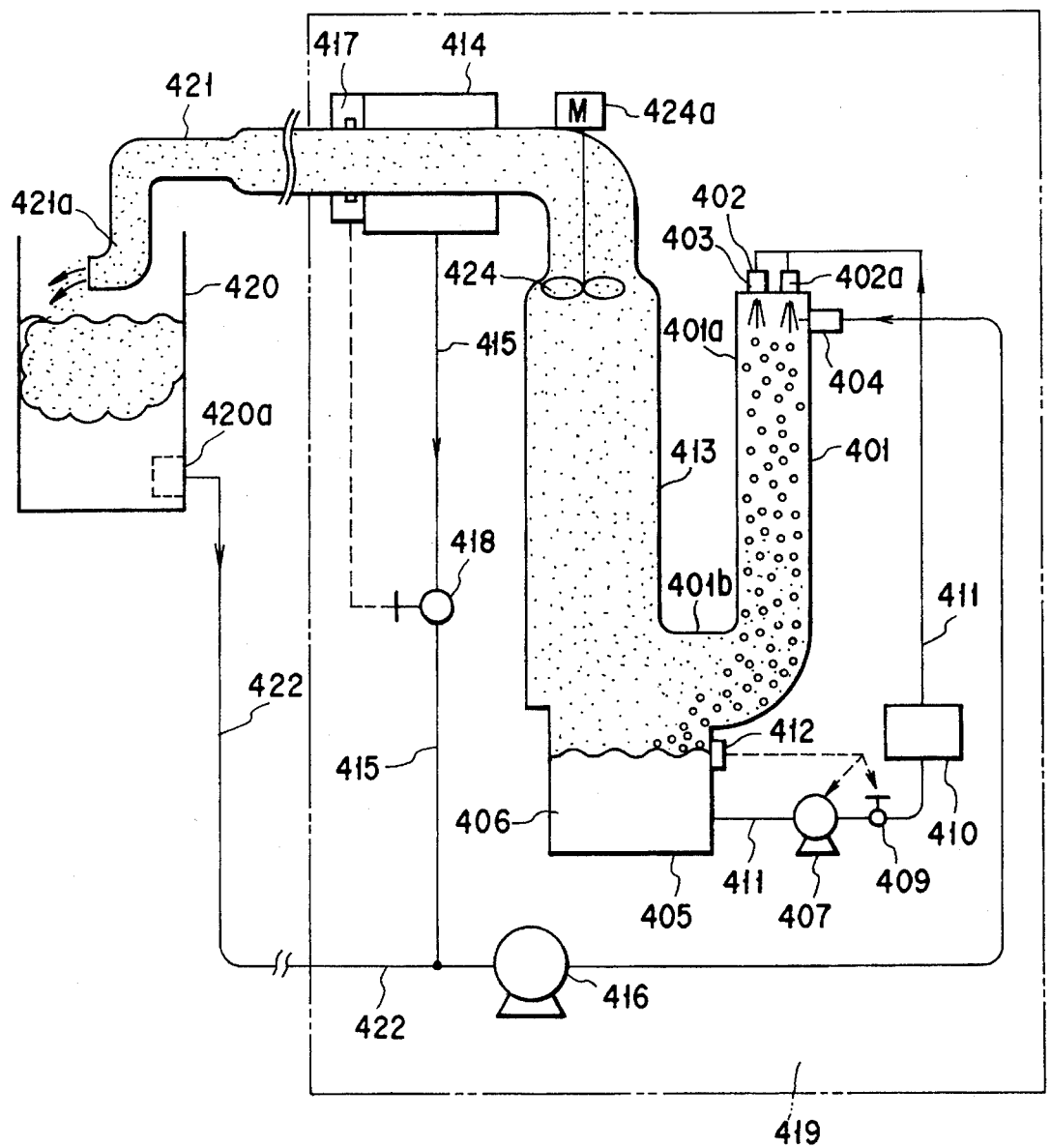
F I G. 28

LATENT HEAT ACCUMULATION SYSTEM

CROSS-REFERENCE TO THE RELATED APPLICATIONS

This application is a continuation-in-part of U.S. patent application Ser. No. 08/417,470, filed Apr. 5, 1995 now U.S. Pat. No. 5,481,882 which is a continuation application of application No. 08/022,556 filed Feb. 25, 1993, now abandoned.

BACKGROUND OF THE INVENTION

1. Field of the Invention

This invention relates to a latent heat accumulation system which can be suitably used in an air-conditioning equipment disposed in a multistoried building, industrial plant, or large-scale regional heat supplying plant.

2. Description of the Related Art

Recently, it is proposed to use a heat accumulation type air-conditioning system for creating a latent heat accumulation medium such as cold water or hot water by driving a heat pump (refrigerator) by utilizing cheap electric power during the nighttime hours and mainly using the latent heat accumulation medium for an air-conditioning system for cooling during the daytime hours. The air-conditioning system is an economically improved air-conditioning equipment and can be suitably used as an air-conditioning equipment disposed in a multistoried building, industrial plant, or large-scale regional heat supplying plant. Further, in recent years, the cooling load in the daytime hours in summer is rapidly increasing. Therefore, stable supply of electric power cannot sometimes be attained. The above air-conditioning system which can reduce the electric power consumption in the daytime hours is of great importance in the stable supply of electric power.

This type of heat accumulation system using ice is generally used for air conditioning. This type of heat accumulation system utilizes water as a latent heat accumulation medium (first liquid). The water is used to continuously make sherbet-state ice with high efficiency. That is, a heat accumulation refrigerant (second liquid) cooled to a temperature equal to or lower than 0° C. is used as a cooling medium. The heat accumulation refrigerant is mainly an oily liquid (non-freezing liquid). The heat accumulation refrigerant is injected into water and brought into direct contact with water to effect the heat exchange and make ice.

Therefore, in the above latent heat accumulation system, the heat transfer efficiency is extremely high and fine ice particles can be obtained. The fine ice particles move upward by the buoyancy thereof. Thus, the non-freezing liquid is always set in contact with water of 0° C. and the ice making operation is repeated. Therefore, the ice making efficiency is high.

As a conventional latent heat accumulation system in which sherbet-state ice is made by direct contact, a latent heat accumulation system shown in FIG. 1 cited from U.S. Pat. No. 2,996,894 or a latent heat accumulation system shown in FIG. 2 cited from Japanese Patent Disclosure No. 2-97845 are provided, for example.

The latent heat accumulation system shown in FIG. 1 includes a container 10A, oil 10B, water 10C and ice 10D stored in the container 10, nozzle 10E, oil circulating system 10F, refrigerator 10G, pump 10H, stirrer 10I, cold carry-away portion 10J and the like.

The latent heat accumulation system shown in FIG. 2 includes an ice making container 20A, heat storage tank 20B, water 20C, oil 20D having a small specific gravity, oil 20E having a large specific gravity, ice 20F, communicating pipe 20G, pump 20H, refrigerator 20I, small-specific-gravity oil circulating pipe 20J, small-specific-gravity oil return pipe 20K, water return pipe 20L, float 20M, pump 20N and the like.

In the latent heat accumulation system shown in FIGS. 1 and 2, water is used as the first liquid and an oily liquid which is lighter than water is used as the second liquid. The second liquid which is cooled by the refrigerator is fed via the pump and pipe and injected into water stored in the bottom portion of the water reservoir.

However, with the above structure, since the density of the second liquid which is a non-freezing liquid is almost the same as that of water or the second liquid is lighter than water, the oily liquid will be mixed into the ice made in the sherbet state. As a result, it becomes difficult to draw out cold water directly from the water tank and supply the cold water to the cooling load. Further, it becomes necessary to use a cold transferring heat exchanger in order to transfer the cold from the water tank. Therefore, the requirements for drawing out the cold in a short period of time, making the construction of the device simple and directly drawing out water cannot be met to a full satisfaction.

As a latent heat accumulation system made for solving the above problem, a system shown in FIG. 3 cited from Japanese Patent Disclosure No. 56-25664 is proposed, for example. The latent heat accumulation system shown in FIG. 3 includes a water tank 30A, water 30B, oil 30C, oil supplying device 30D, separation film 30E, return port 30F for circulating water, pump 30G, refrigerator 30H, outlet port 30I for cold water and the like.

In the latent heat accumulation system of FIG. 3, a first liquid (water) is stored in the water tank. A second liquid (which is an oily liquid and is lighter than water and ice) is injected from the bottom portion of the water tank into the first liquid in the upward direction. The second liquid is cooled to a temperature lower than the freezing or solidifying point of the first liquid (water) by the refrigerator. Thus, heat exchange occurs when the second liquid is brought into direct contact with the water. The water is partly frozen and the second liquid moves upwardly in the partly frozen water. In this respect, the condition is the same as that of FIG. 1. Further, the separation film (corelesser) is disposed in the upper portion. The separation film permits the passage of the second liquid (oily liquid) but inhibits the passage of ice. Thus, the amount of use of the oily liquid or second liquid is relatively reduced.

The outlet port is disposed below the separation film. In the bottom portion of the water tank, the cold water outlet port is disposed. With this arrangement, the first liquid which is warmed by absorbing heat from the cooling load can be circulated. Further, it is possible to draw out water directly from the water tank.

However, with the above structure, a problem that emulsion of the second liquid occurs in the process of injecting into the water and a problem that the second liquid flows into the air-conditioning load may occur. That is, separation of the first liquid from the second liquid is imperfect.

In general, when an oily liquid is used as the second liquid, the second liquid injected into the first liquid is set into the emulsion state or turbid state. For this reason, it sometimes takes a long time for the second liquid to be separated from the first liquid. Therefore, it may become necessary to draw out the second liquid by use of a heat exchanger, making it necessary to use a large-scale device.

For the above-described reason, the above system cannot be conveniently used and is not generally accepted by the users although the ice making efficiency thereof is high.

In a heat accumulation system shown in FIG. 4 cited from Japanese Patent Disclosure No. 1-244225, a heat accumulation system shown in FIG. 5 cited from Japanese Patent Disclosure No. 2-110231 and a heat accumulation system shown in FIG. 6 cited from Japanese Patent Disclosure No. 3-140767, a liquid having a specific gravity larger than that of the first liquid is used as the second liquid.

The heat accumulation system shown in FIG. 4 includes an ice making tank 40A, heat accumulation tank 40B, water 40C, heat exchanger 40D, water supply pipe 40E, ice 40F, circulating system 40G, ice making liquid 40H and the like.

The heat accumulation system shown in FIG. 5 includes an ice making tank 50A, heat accumulation tank 50B, water 50C, oil 50D, air 50E, ice 50F, circulating system 50G, return path 50H, communicating pipe 50I and the like.

The heat accumulation system shown in FIG. 6 includes a water tank 60A, water 60B, oil 60C, ice 60D, cold transferring section 60E, cooling system 60F and the like.

In the heat accumulation systems shown in FIGS. 4 to 6, the second liquid is stored in the bottom portion of the water tank. The second liquid is cooled by a heat exchanger or refrigerator. Water or the first liquid is injected into the second liquid which is cooled from the bottom portion of the water tank (FIGS. 4 and 6). The boundary portion between the first and second liquids is stirred to change ice formed in the boundary portion into fine ice particles (FIG. 5). In this system, the temperature of the second liquid introduced into the refrigerator becomes relatively lower than that of the freezing or solidifying point (0° C. in the case of water) of the first liquid. Further, in the above systems, a problem that the freezing efficiency cannot be enhanced although a high heat transfer characteristic can be attained by the direct contact between the first and second liquids occurs.

In order to solve the above problem, a latent heat accumulation system shown in FIG. 7 cited from Japanese Patent Disclosure No. 3-140767 is proposed. The latent heat accumulation system shown in FIG. 7 includes a water tank 70A, water 70B, oil 70C, ice 70D, cold transferring section 70E, cooling system 70F and the like.

In the latent heat accumulation system shown in FIG. 7, the second liquid is collected from the bottom portion of the water tank. The second liquid is cooled to a temperature equal to or lower than the freezing or solidifying point of the first liquid (water) by the refrigerator. The cooled second liquid is poured from a portion in the air into the water tank. In this case, while the second liquid (oily liquid) which is heavier than water is falling and deposited in the water, it sufficiently exchanges heat with the water. The temperature of the second liquid is raised to substantially the water temperature by the time the second liquid is collected from the bottom portion of the water tank. Therefore, the freezing efficiency of the second liquid can be held high.

However, in this system, hard and heavy ice blocks are formed. Generally, such ice blocks are deposited in the boundary portion between the first and second liquids and cannot rise to the surface. The same problem occurs in the systems of FIGS. 4, 5 and 6.

SUMMARY OF THE INVENTION

The object of the present invention is to provide a latent heat accumulation system having a highly reliable, highly efficient transfer mechanism wherein a solid phase material which can be used as cooling medium can be smoothly fed to a pipe and transferred by a pump.

The above object can be achieved by a latent heat accumulation system having a transfer mechanism, the system comprising:

a production tank in which a first fluid is put in direct contact with a second fluid, which does not combine with the first fluid, has a specific gravity greater than that of the first fluid and is cooled to a preset temperature level, thus producing a solid phase material of the first fluid;

a recovery section, formed at a lower part of said production tank, for recovering the second fluid descending within the production tank;

an upward pipe, connected to said production tank, for guiding upward a two-phase stream of said first fluid and said solid phase material within the production tank;

a transfer pipe, connected to said upward pipe, for transferring said two-phase stream to a specified place;

a reservoir tank for storing the two-phase stream transferred via said transfer pipe;

a first fluid circulation system for draining the first fluid from the reservoir tank and introducing the drained first fluid into the production tank; and a second fluid circulation system for cooling the second fluid recovered by said recovery section and feeding the cooled second fluid into the production tank for bringing the second fluid into direct contact with the first fluid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is a cross sectional view showing a second example of the construction of the outlet nozzle portion for refrigerant;

FIG. 17 is a cross sectional view showing a third example of the construction of the outlet nozzle portion for refrigerant;

FIG. 19 is a view showing the construction of a separator used in the embodiment of this invention;

FIG. 20 is a view showing the construction of another embodiment of this invention;

FIG. 22 is an enlarged view of the main portion of the embodiment shown in FIG. 21;

FIG. 25 shows a first embodiment of a latent heat accumulation system having an ice transferring mechanism according to the present invention;

FIG. 26 is a cross sectional view of the system shown in FIG. 25;

FIG. 27 shows a second embodiment of a latent heat accumulation system having an ice transferring mechanism according to the invention;

FIG. 28 shows a third embodiment of a latent heat accumulation system having an ice transferring mechanism according to the invention;

DETAILED DESCRIPTION OF THE PREFERRED EMBODIMENTS

Figure 1:
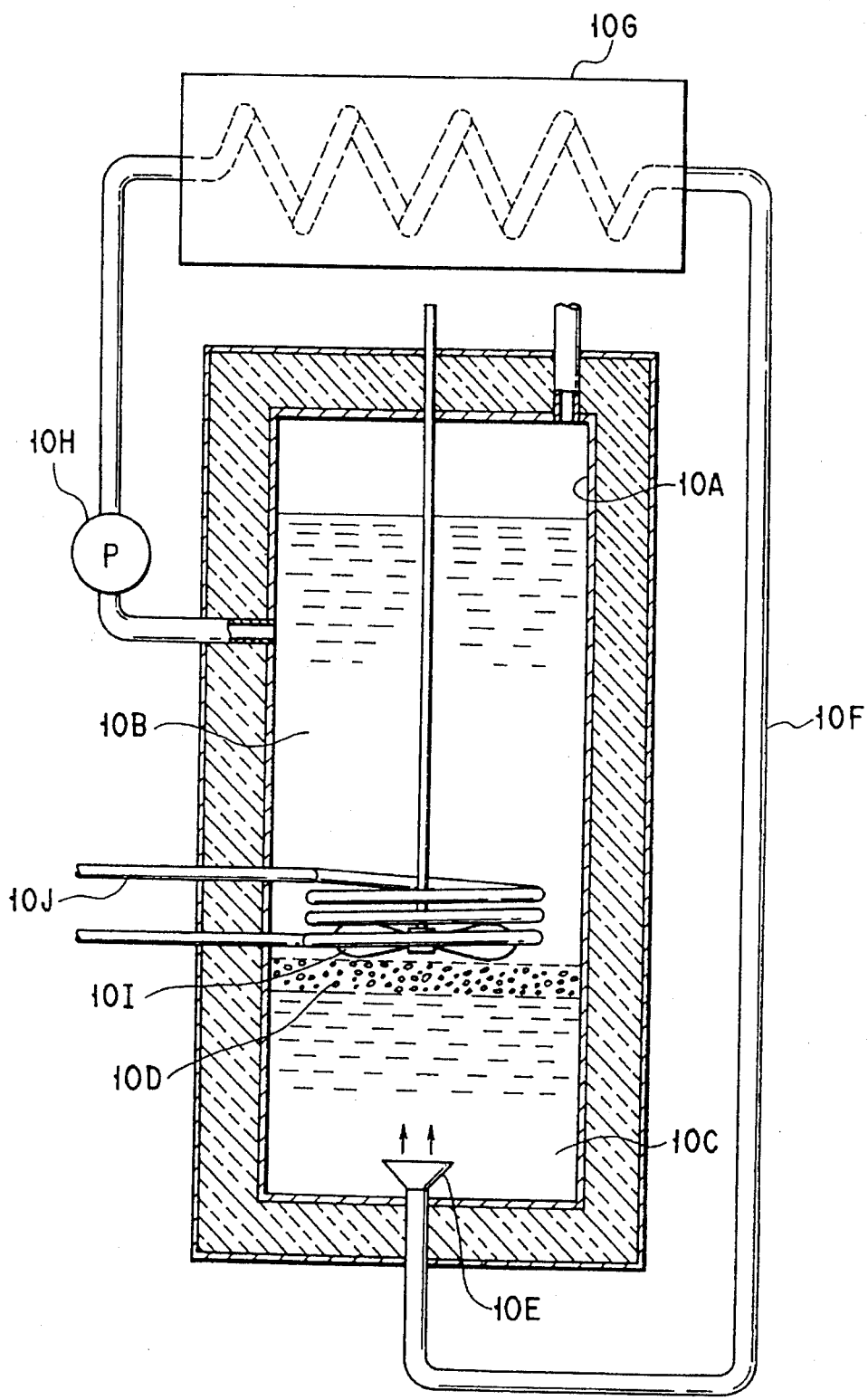
FIG. 1 is a view showing the first construction of a conventional direct contact type latent heat accumulation system using a non-freezing liquid which is not soluble in water.
Figure 2:
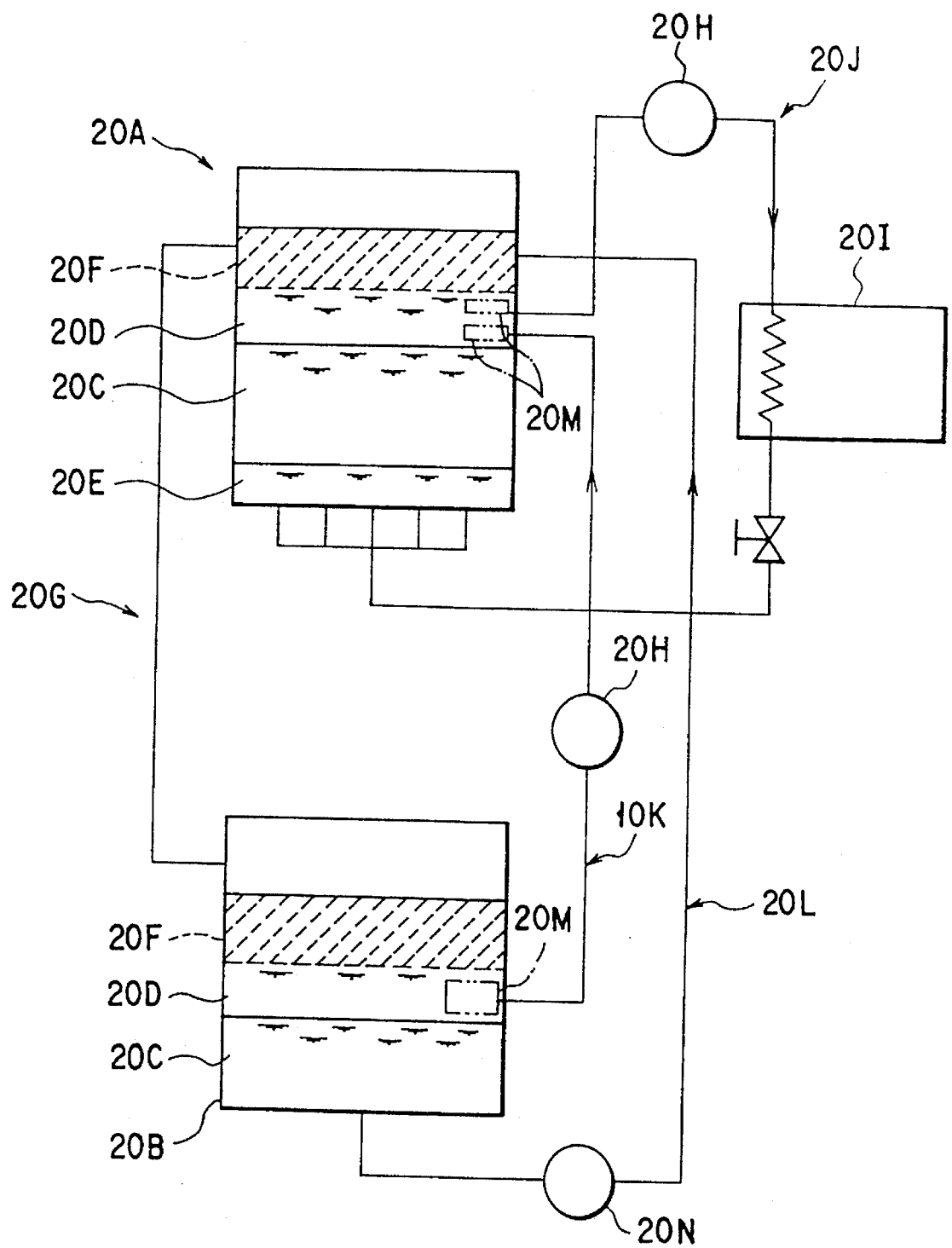
FIG. 2 is a view showing the second construction of the conventional direct contact type latent heat accumulation system.
Figure 3:
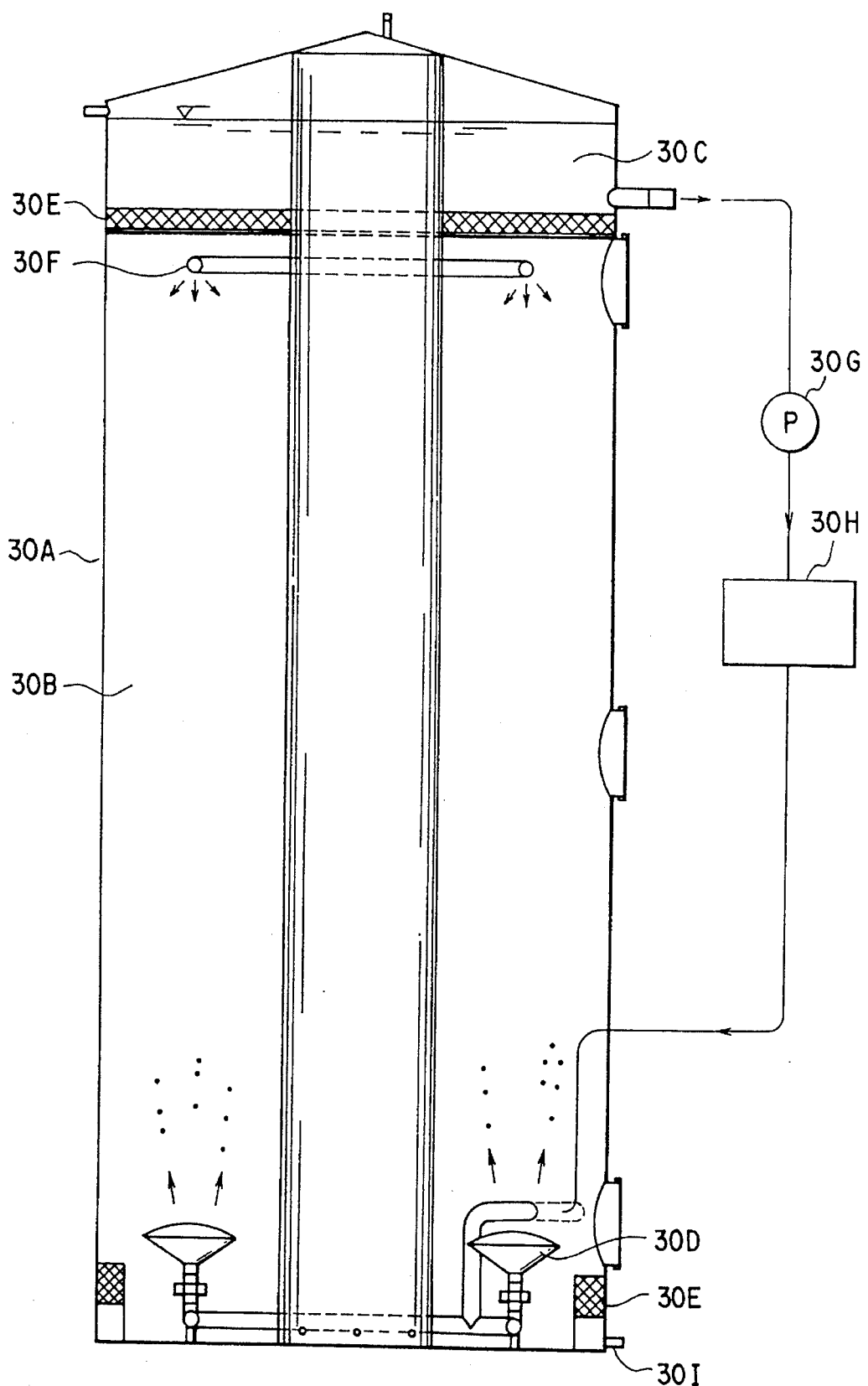
FIG. 3 is a view showing the third construction of the conventional direct contact type latent heat accumulation system.
Figure 4:
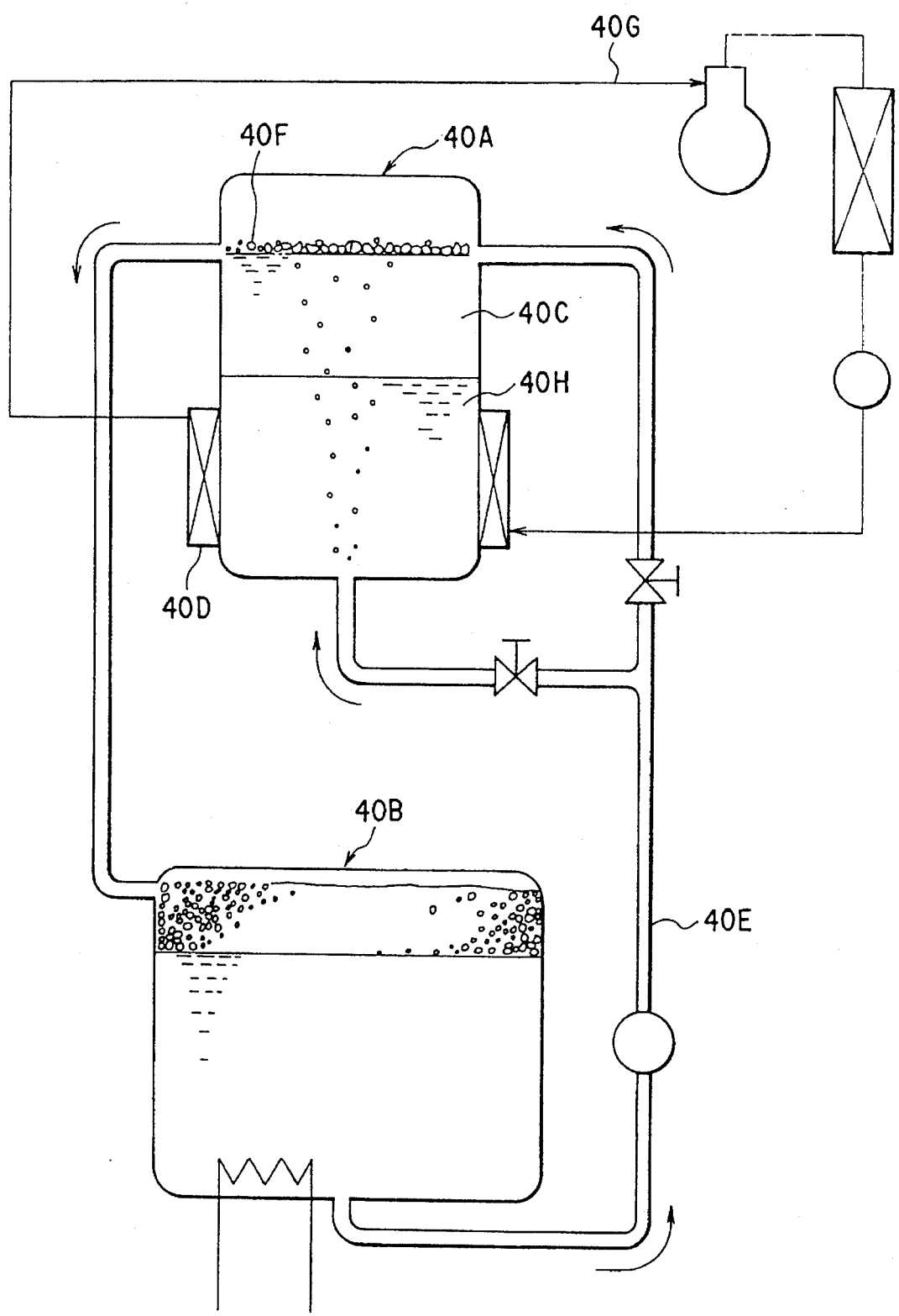
FIG. 4 is a view showing the fourth construction of the conventional direct contact type latent heat accumulation system.
Figure 5:
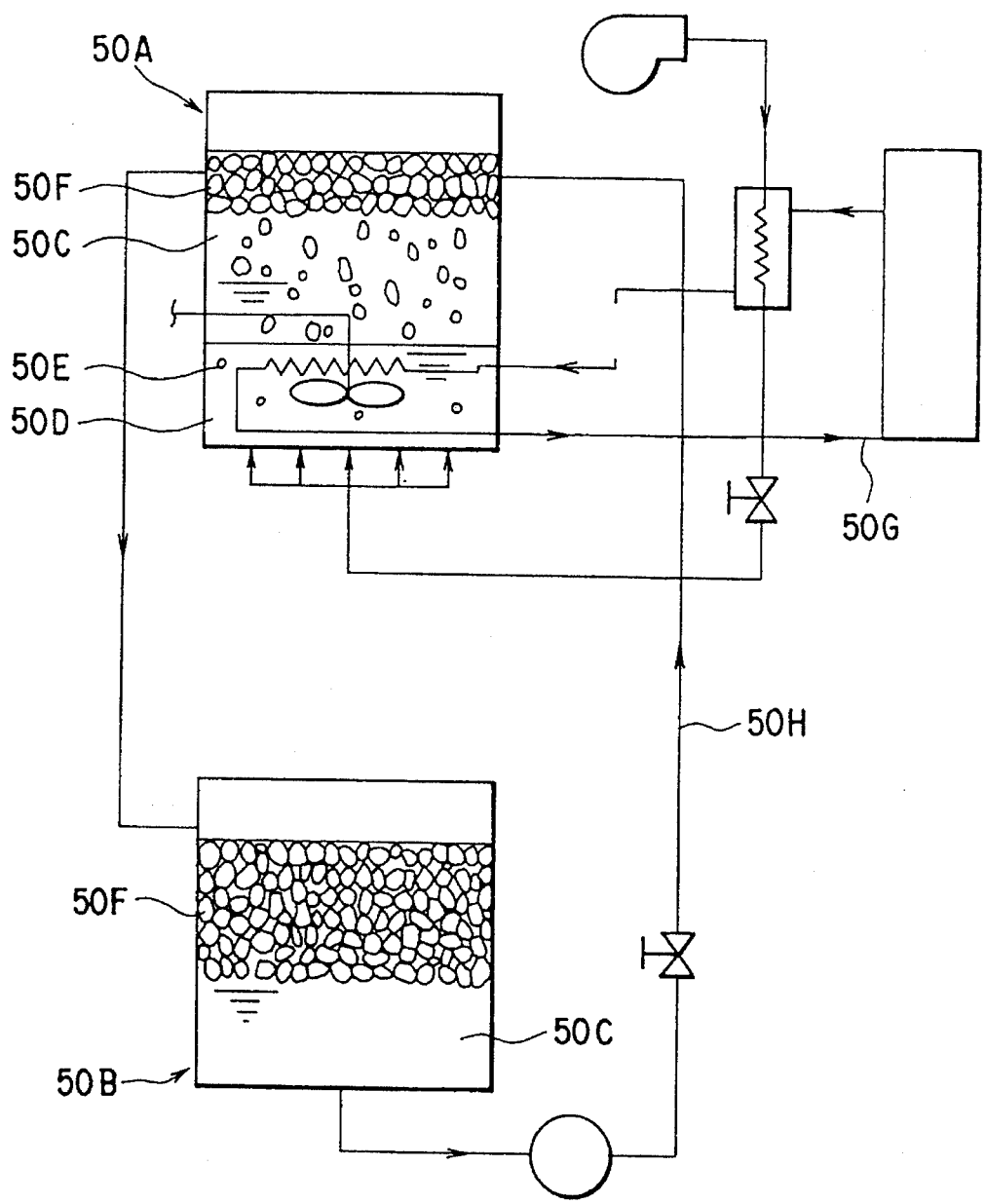
FIG. 5 is a view showing the fifth construction of the conventional direct contact type latent heat accumulation system.
Figure 6:
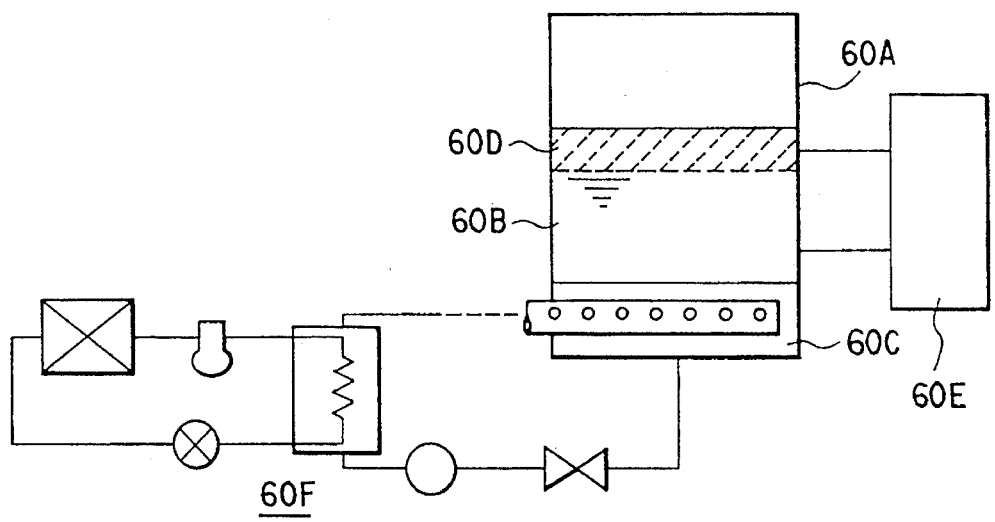
FIG. 6 is a view showing the sixth construction of the conventional direct contact type latent heat accumulation system.
Figure 7:
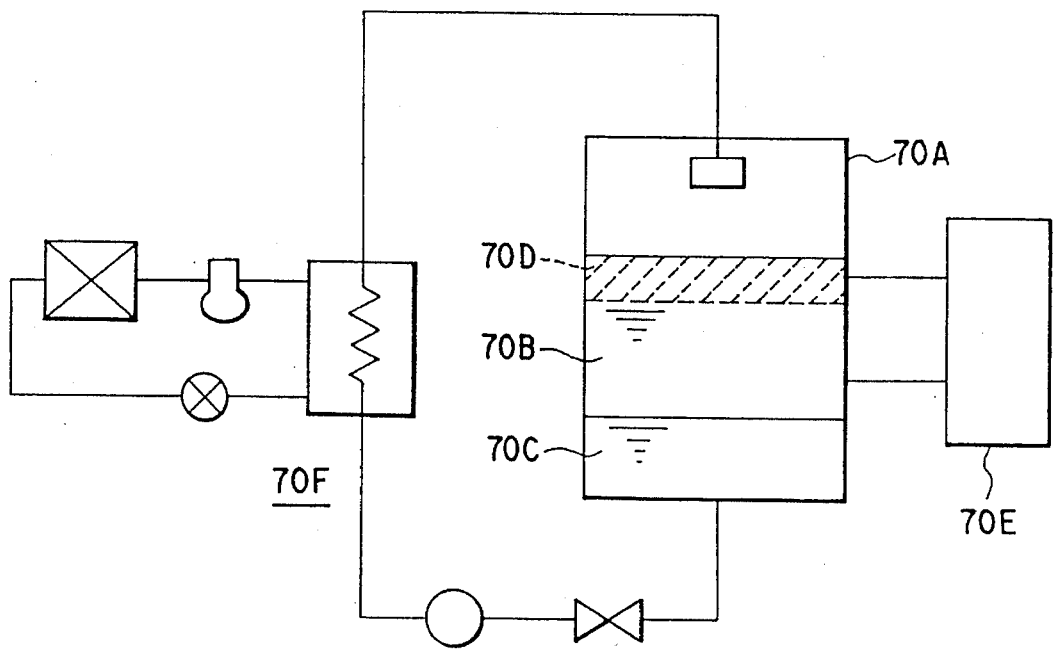
FIG. 7 is a view showing the seventh construction of the conventional direct contact type latent heat accumulation system.
Figure 8:
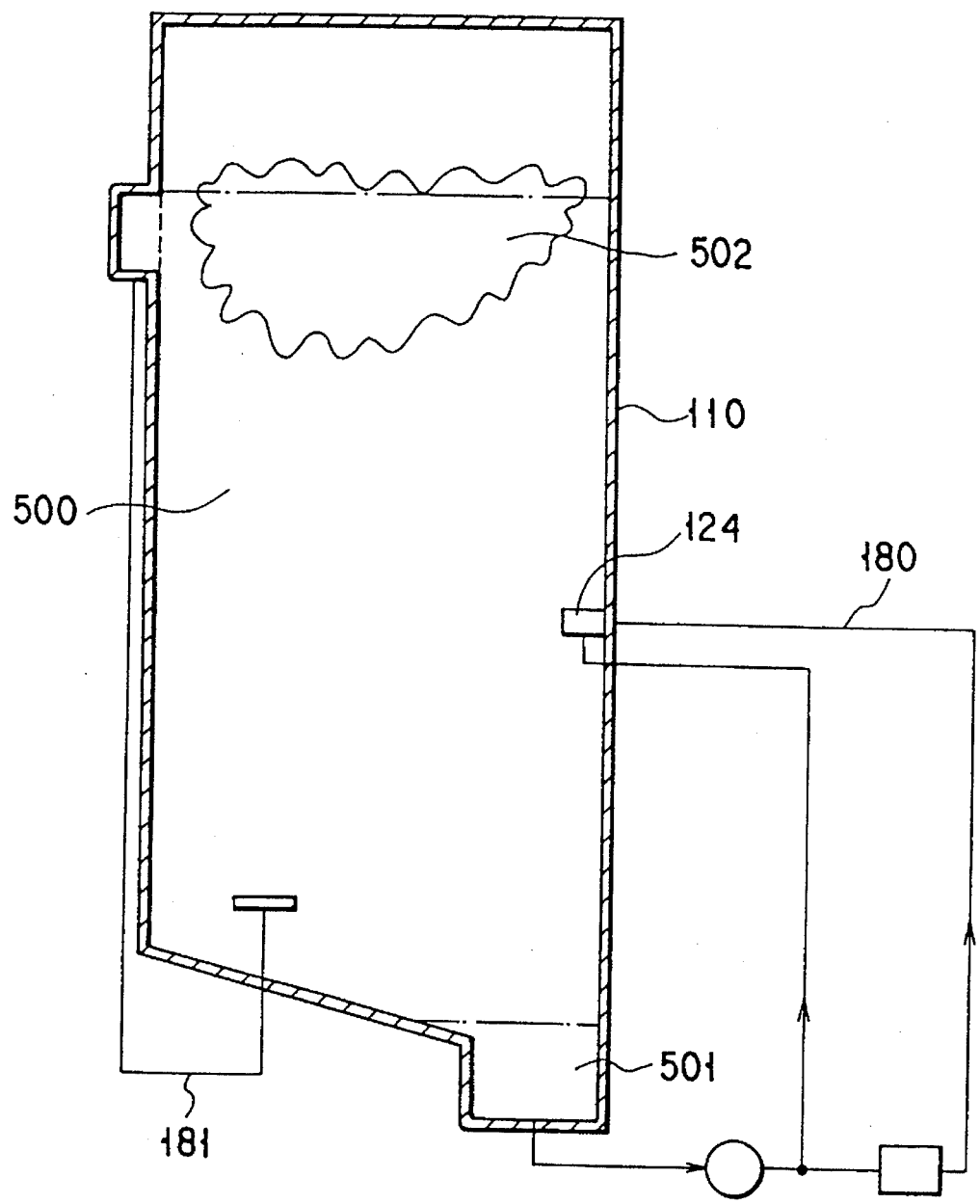
FIG. 8 is a view for illustrating the principle of this invention.

FIG. 8 is a view for illustrating the principle of a latent heat accumulation system according to this invention. The latent heat accumulation system includes a water tank 110 in which water 500, refrigerant (trade name: Fluorinate) 501 and ice 502 are stored. A refrigerant circulating system 180 and a water circulating system 181 are additionally provided for the water tank 110. The construction of FIG. 8 is used in the systems shown in FIGS. 8 to 26.

Figure 9:
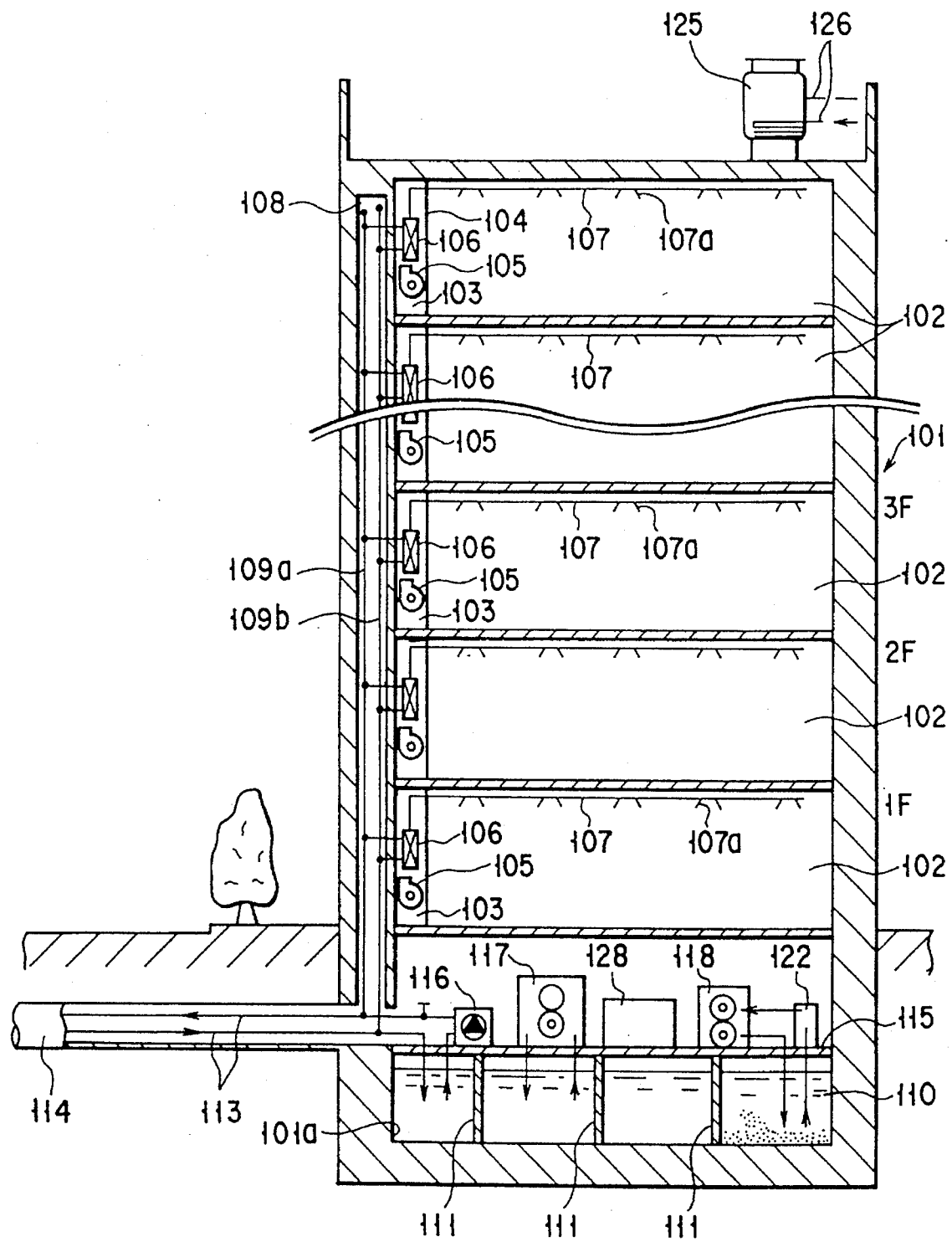
FIG. 9 is a cross sectional view of a latent heat accumulation system according to a first embodiment of this invention in a case where it is disposed in a regional heat supply plant installed in the basement of a multistoried building.
Figure 10:
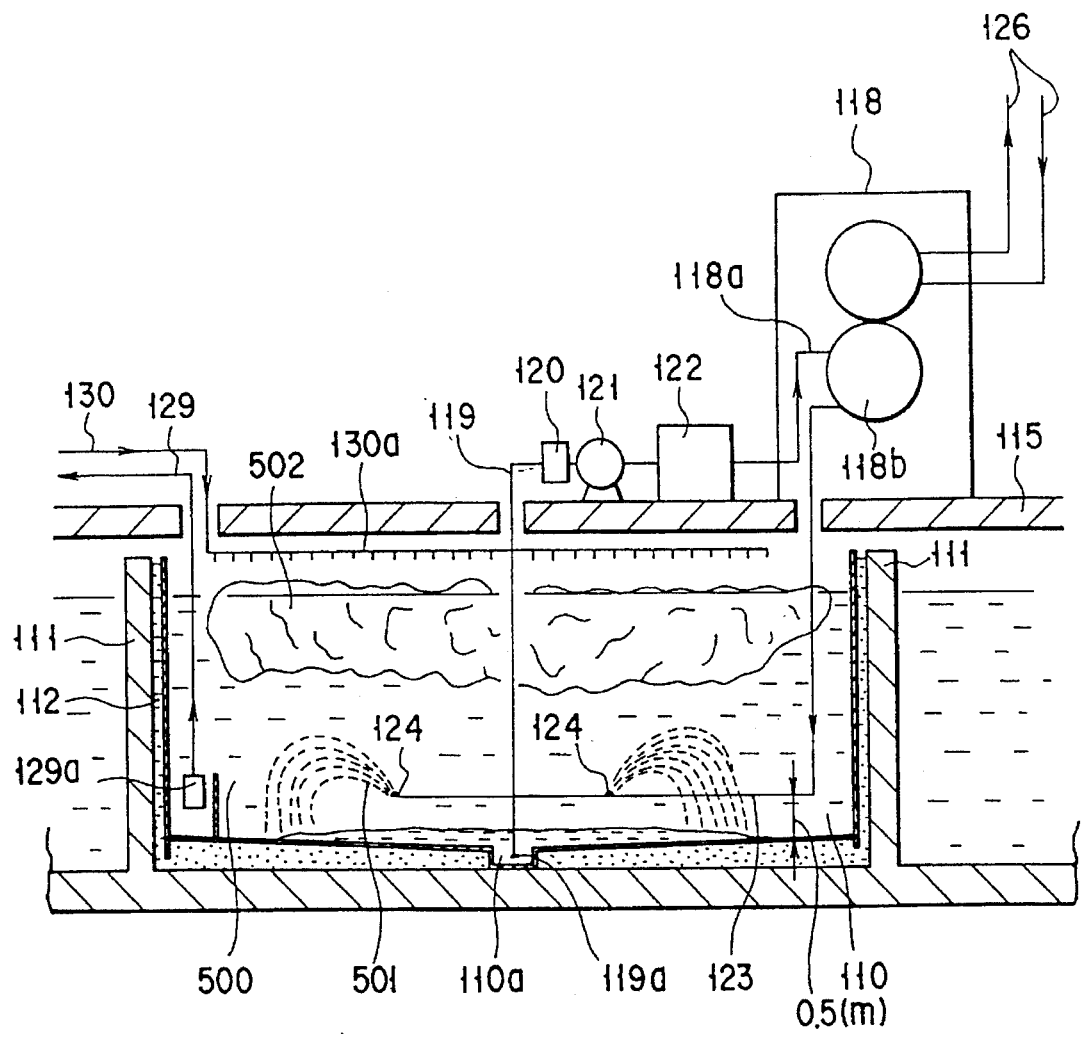
FIG. 10 is a cross sectional view showing the main portion of the latent heat accumulation system of the same embodiment.

FIGS. 9 and 10 are views showing one embodiment of a latent heat accumulation system according to this invention. As shown in FIG. 9, storage chambers 103 are defined by partition boards 104 in respective rooms 102 on the respective stories of a multistoried building 101. Indoor heat exchangers 106 having cooling fans 105 are disposed in the respective storage chambers 103. Further, cold wind supply pipes 107 having air blow-off ports 107a are connected to the respective indoor heat exchangers 106. The cold wind supply pipes 107 are arranged to extend along the ceiling sides of the respective rooms 102. A through air hole is formed in a vertical direction in that portion of the multistoried building 101 which lies near the storage chambers 103. A cold water supply pipe 109a and return pipe 109b are laid in the through air hole 108. The supply pipe 109a and return pipe 109b are connected to all of the indoor heat exchangers 106. Each of the indoor heat exchangers 106 creates cold air by the heat exchange between the cold water and air by means of the cooling fan 105. The cold air is supplied into the room 102 via the cold wind supply pipe 107 to lower the room temperature to a preset level. The cold water subjected to the heat exchange is returned to the water tank 110 installed in the basement 101a of the multistoried building 101 as will be described later via the return pipe 109b.

As shown in FIG. 10, the basement 101a of the multistoried building 101 is divided by partition boards 111 each having a communication hole. Thus, the water tank 110 has a plurality of water tank units. The bottom portion of the water tank 110 is formed to have inclined surfaces which extend downwardly from the peripheral portions towards the center and a concave portion is formed as a storage portion 110a for a second liquid 501 in the central bottom portion. Heat insulation sheets 112 are attached to the bottom and inner wall portions of the water tank 110 and the partition boards 111.

As shown in FIG. 9, the water tank 110 is connected to a commercial water pipe 113 via a closing valve. The commercial water pipe 113 is disposed in the underground multi-purpose duct buried in the ground outside the building 101.

Figure 11:
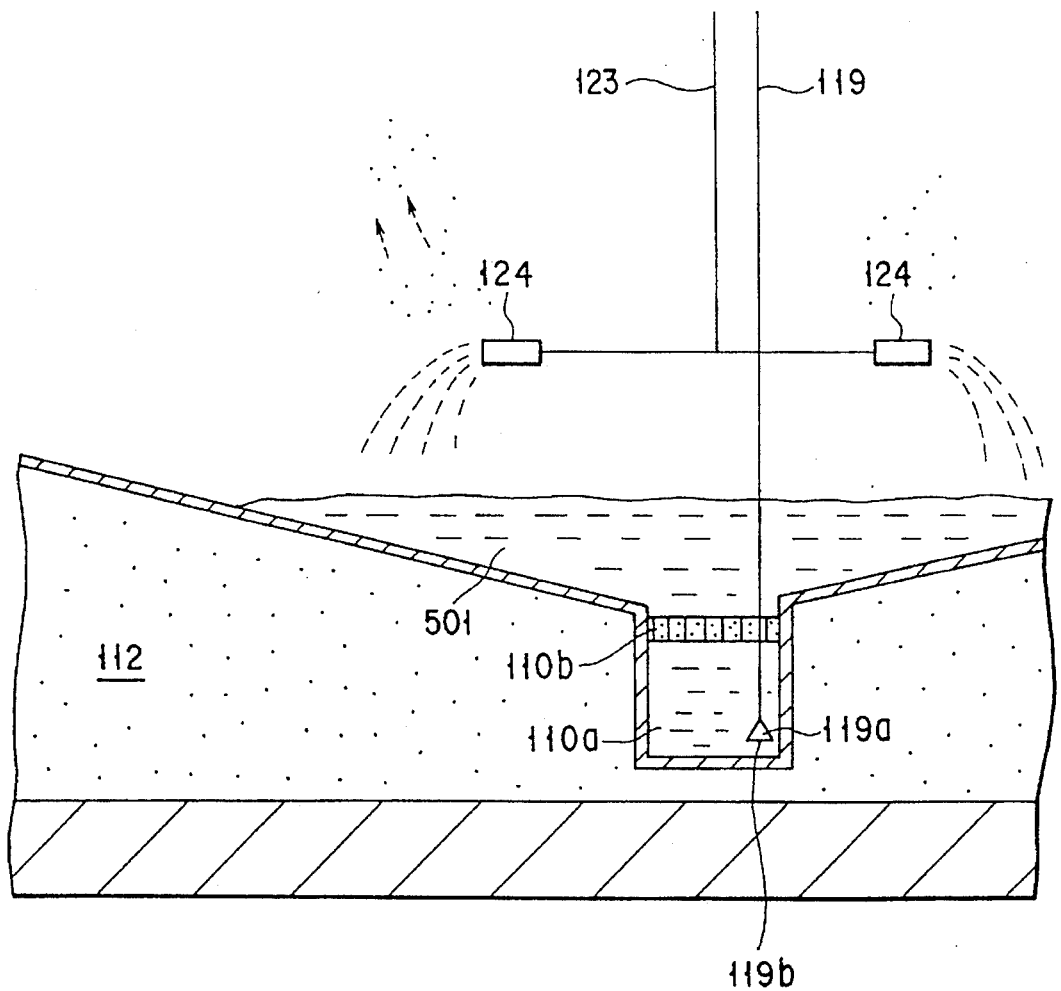
FIG. 11 is an enlarged cross sectional view of a water tank shown in FIG. 10.

Cold water 500 or the first liquid and a refrigerant 501 or the second liquid having a larger specific gravity are mixed and stored in the water tank 110. In this embodiment, as the refrigerant 501, a refrigerant having a specific gravity which is more than 1.5 times that of the first liquid and a solidifying point lower than the first liquid is used, for example. As shown in FIGS. 10 and 11, when the refrigerant 501 is deposited on the bottom portion of the water tank 110, it flows towards the storage portion 110a along the inclined surface of the bottom portion of the water tank 110 by its own weight and remains there.

A base plate 115 is horizontally disposed on the upper portion of the basement 101a of the multistoried building 101 to cover the water tank 110. A pump 116 and heat pump 117 constructing a cold/warm water supplying system are disposed on the base plate 115. The pump 116 and heat pump 117 are connected to the supply pipes 109a and 109b via a switching valve.

Further, a refrigerating machine 118 is disposed on the base plate 115. The inlet port 118a of the refrigerating machine 118 is connected to a supply pipe 119. The supply pipe 119 has an inlet port 119a for refrigerant. The inlet port 119a is formed in communication with the storage portion 110a formed in the bottom portion of the water tank 110. As shown in FIG. 11, a vortex preventing portion 110b formed of a porous plate is disposed over the storage portion 110a. The vortex preventing portion 110b is provided to prevent a vortex from being generated by the refrigerant 501 flowing into the storage portion 110a. Further, a guide 119b for defining the intake direction is disposed on the inlet port 119a provided at the end portion of the supply pipe 119 so as to prevent the cold water 500 from being mixed into the refrigerant 501.

The supply pipe 119 is connected to the inlet port 118a of the refrigerating machine 118. A strainer 120, suction pump 121 and water/liquid separation device 122 are connected to the supply pipe 119 in this order.

The refrigerating machine 118 has an evaporator 118b. A delivery pipe 123 is connected to the evaporator 118b. The delivery pipe 123 is laid in the cold water 500 in the water tank 110. The end portion of the delivery pipe 123 is held in a horizontal position near the bottom surface of the water tank 110. A plurality of injection nozzles 124 are formed on the end portion of the delivery pipe 123.

Further, as shown in FIG. 9, an air-conditioning control device 128 is disposed on the base plate 115 near the refrigerating machine 118. The air-conditioning control device 128 controls the air-conditioning operation in the multistoried building 101 and various instruments in the heat supplying plant.

A cold water supply pipe 129 has an intake port 129a for drawing cold water. The intake port 129a is disposed in the cold water in the water tank 110. The cold water supply pipe 129 is connected to the lower end portion of the supply pipe 109a shown in FIG. 9 via an open/closing valve (not shown).

A returning pipe 130 is connected to the lower end portion of the return pipe 109 shown in FIG. 9. The returning pipe 130 is connected to a sprinkling pipe 130a disposed in a space between the water tank 110 and the base plate 115. The sprinkling pipe 130a has a plurality of cold water discharging ports for returning cold water into the water tank 110.

The refrigerating machine 118 is controlled according to the operation control of the air-conditioning control device 128. The control operation of the air-conditioning control device 128 is effected so as to supply the refrigerant to a plurality of water tank units of the water tank 110 simultaneously or with time delay.

Figure 12:
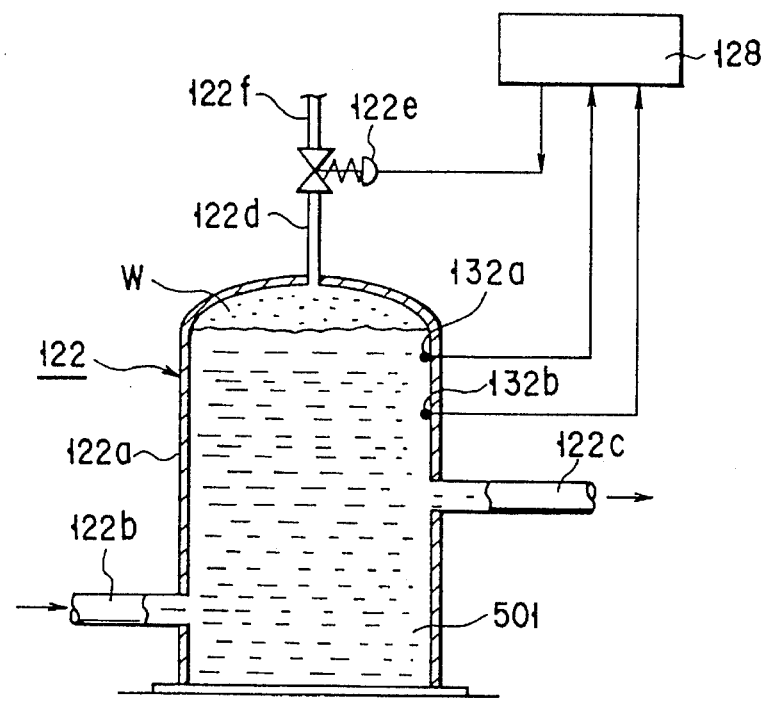
FIG. 12 is an enlarged cross sectional view of a refrigerant separation and collection device utilizing the centrifugal force shown in FIG. 10.
Figure 13:
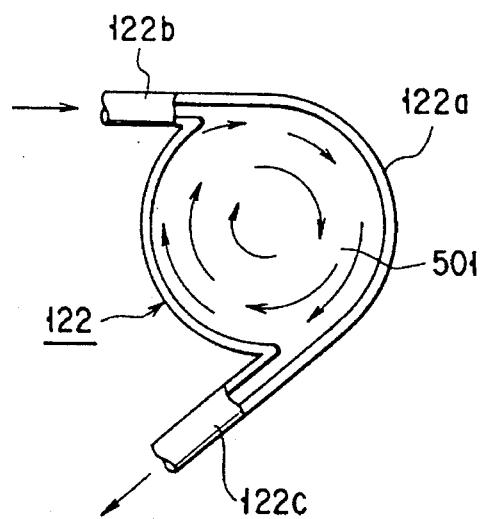
FIG. 13 is a partial cross sectional view of the refrigerant separation and collection device of FIG. 12 as viewed from the above.

The water/liquid separation device 122 is constructed as shown in FIGS. 12 and 13. That is, the water/liquid separation device 122 has a tank 122a. The tank 122a has an inlet port 122b and an outlet portion 122c formed in position lower than the inlet port 122b. Further, an exhaust port 122d is formed in the upper surface portion of the tank 122a. The inlet port 122b of the tank 122a is connected to the suction pump 121 via a communicating pipe. The outlet port 122c is connected to the inlet port 118a of the refrigerator 18. Further, the exhaust port 122d is connected to a drain pipe 122f for draining cold water via an electromagnetic valve 122e. A pair of electrical resistance sensors 132a and 132b are disposed on the inner wall of the tank 122a in position higher than the inlet port 122b and placed apart from each other in the vertical direction. The electrical resistance sensors 132a and 132b are used to detect the boundary between the cold water 500 and the refrigerant 501 by utilizing the difference between the electrical resistances thereof. Detection signals from the electrical resistance sensors 132a and 132b are supplied to the air-conditioning control device 128 via respective lines.

The air-conditioning control device 128 controls the open/closing position of the electromagnetic valve 122e according to the detection signals of the electrical resistance sensors 132a and 132b to control the displacement of cold water so as to separate the refrigerant 501 and the cold water 500 in the tank 122a from each other at the reference boundary surface. When the water is accumulated separately from the refrigerant in the tank 122a of the water/liquid separation device 122, the position of the boundary surface between the water and refrigerant can be detected by the electrical resistance sensors 132a and 132b. The detection signals of the electrical resistance sensors 132a and 132b are supplied to the air-conditioning control device 128 which opens the electromagnetic valve 122e according to the detection signals. Therefore, the water in the tank 122a is forcedly moved upwardly by the pressure of the refrigerant newly drawn into the tank 122a and is drained via the drain pipe 122f. As a result, the boundary surface between the cold water and refrigerant rises, and when the reference boundary surface is detected by the electrical resistance sensors 132a and 132b, the detection signals of the electrical resistance sensors 132a and 132b are supplied to the air-conditioning control device 128 which in turn closes the electromagnetic valve 122e in response to the detection signals. Thus, the water level is controlled to be automatically set at the reference boundary surface.

Next, the operation of the latent heat accumulation system according to this embodiment with the above structure is explained. Referring to FIGS. 9 and 10, when the suction pump 121 is driven by mainly utilizing cheap electric power during the nighttime hours, the refrigerant 501 or the second liquid which is stored in the storage portion 110a formed in the bottom portion of the water tank 110 is forcedly supplied upwardly to the water/liquid separation device 122 via the supply pipe 119. In the water/liquid separation device 122, cold water 500 or first liquid mixed in the refrigerant 501 although small in amount is separated from the refrigerant. As explained with reference to FIGS. 12 and 13, the separated cold water 500 is returned to the water tank 110 via the drain pipe 122f and the high purity refrigerant 501 is supplied to the refrigerator 118. The refrigerator 118 cools the refrigerant 501 fed from the water/liquid separation device 122 to a temperature lower than the freezing point (0° C.) of water (the first liquid). The cooled refrigerant 501 is fed to the plurality of tank units of the water tank 110 via the delivery pipe 123 and injected from the injection nozzles 124 into the cold water 500 in the respective tank units simultaneously or with time delay. As a result, the cold water 500 is subjected to the heat exchange with respect to the refrigerant 501 which is injected from the injection nozzles 124 and kept at an extremely low temperature.

In this case, the injection nozzles 124 are set in sufficiently high positions from the bottom surface of the water tank 110 so as to permit the refrigerant 501 injected from the nozzles and the cold water 500 to be fully subjected to the heat exchange with each other. For example, the injection nozzles 124 are set above and apart at least 0.5 m from the boundary surface between the first and second liquids. With this arrangement, the temperature of the refrigerant 501 may be raised to substantially the same temperature as the water by the time it reaches the storage portion 110a on the bottom portion of the water tank 110. Thus, the efficiency of heat exchange by the refrigerant 501 higher than 95% can be attained.

Further, in the water tank 110, ice 502 is stored in position above the injection nozzles 124. It should be noted that since the injection nozzles 124 are not set in unnecessarily high positions in the water tank 110, a sufficiently large amount of ice 502 can be obtained in the water tank 110 and the sherbet-state ice 502 which can easily thaw can be stably made.

As shown in FIGS. 12 and 13, since the inlet port 122b and the outlet port 122c disposed in position lower than the inlet port 122b are formed in the tank 122a of the water/liquid separation device 122, the refrigerant 501 supplied from the storage portion 110a of the water tank 110 and fed via the supply pipe 119 is fed into the tank 122a via the inlet port 122b. At this time, the refrigerant 501 is discharged from the outlet port 122c while making a vortex in the tank 122a. Therefore, after the cold water 500 whose specific gravity is small is collected into the center of the vortex by the centrifugal separation process, the cold water 500 rises by the buoyancy thereof and is then discharged from the outlet port 122c of the tank 122a towards the refrigerator 118. Thus, the refrigerant 501 and the cold water 500 can be automatically separated from each other with high efficiency without using a special separation film or device.

As shown in FIG. 11, the vortex preventing portion 110b is provided to prevent a vortex from being generated at the suction portion when the refrigerant 501 is drawn from the storage portion 110a of the water tank 110 via the supply pipe 119. The vortex preventing portion 110b is disposed above the storage portion 110a of the water tank 110. The vortex preventing portion 110b is formed of a porous plate. Further, the guide 119a for defining the intake direction of the refrigerant 501 is disposed on the inlet port 119a provided at the front end portion of the supply pipe 119. Therefore, the necessary depth of the storage portion 110a can be reduced and the amount of cold water 500 contained in the refrigerant 501 flowing into the supply pipe 119 can be significantly reduced.

As shown in FIGS. 9 and 10, the sherbet-state ice 502 which can easily thaw is stored in the water tank 110. The ice 502 can rapidly thaw by spraying water which is warmed by carrying away heat from the cooling loads in the respective rooms or the building onto the sherbet-state ice 502. Immediately after the ice 502 has thawed, ice 502 rises towards the surface so that cold water can be rapidly obtained.

As described above, according to this embodiment, the high efficiency, stable operation, high controllability, simplicity, high-speed thawing property, direct water-intake ability and the like which are indispensable conditions for the ice heat accumulation device in the large-scale regional heat supply plant can be satisfied. That is, in the large-scale regional heat supply plant installed in the underground of the midtown area and constructed by a large-capacity heat pump, water tank, water conveying pumps, flow control valves, calorimeter and the like, the heat accumulation capacity can be increased to several times that of the conventional case by improving the conventional water tank without deteriorating the usability of the plant. Further, in the novel plant, the total effect including the effect that the necessary area for the plant can be reduced can be attained.

Thus, the ice making efficiency can be enhanced by 20 to 40% in comparison with the conventional ice heat accumulation device, the thawing speed is sufficiently high, direct water-intake from the water tank and water return to the water tank can be attained to enhance the usability, the controllability can be enhanced and ice can be additionally made. Further, in the intermediate periods of a year such as the spring and autumn, cold water can be made, the same efficiency as in the conventional case can be attained, and the device can be made extremely simple in construction and easily maintained.

Further, it is possible to additionally provide the device to the conventional water circulating type device as an ice heat accumulation device for each building, and in this case, not only the effect that ice can be additionally made but also the effect that a special control is not required and the inspection and maintenance service can be made easy can be attained.

Figure 14:
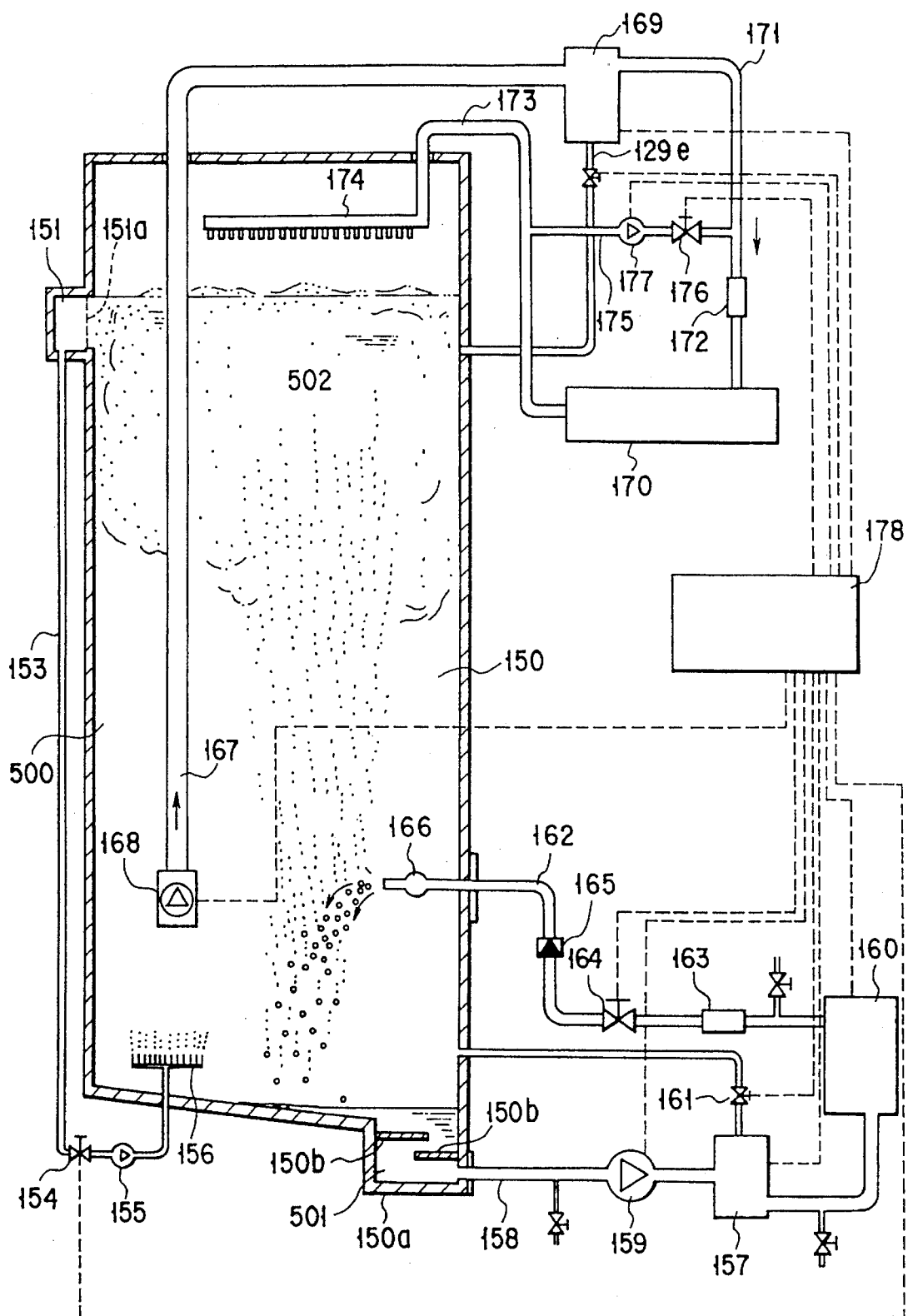
FIG. 14 is a cross sectional view of the main portion of a latent heat accumulation system according to a second embodiment of this invention in a case where it is disposed on the rooftop of building.

Next, a latent heat accumulation system according to another embodiment of this invention is explained with reference to FIG. 14. FIG. 14 shows the construction of an ice heat accumulation device disposed on the rooftop of a building. As shown in FIG. 14, a water tank 150 is disposed on the rooftop of the building and stores therein cold water 500 as a first liquid and a refrigerant 501 as a second liquid having a larger specific gravity. The water tank 150 is made long in the height direction and the bottom surface of the water tank has an inclined surface and a storage portion 150a for storing the refrigerant 501 is formed in the lower end portion of the inclined surface. A pair of vortex preventing portions 150b each formed of a porous plate for preventing occurrence of a vortex caused by introduction of the refrigerant 501 are mounted in the storage portion 150a in different positions in the vertical direction. Further, a plurality of water-intank portions 151 are formed on the upper portion of the water tank 150. In the open surface of the water-intake portion 151 which faces the inside portion of the water tank, a separator 151a formed of a wire mesh for separating the water 500 from ice 502 and drawing out only the water 500 is disposed. An annular water-intake portion continuously formed on the peripheral surface of the water tank can be used instead of the water-intake portions.

One end portion of a pipe 153 disposed outside the water tank to vertically extend is connected to the discharging port of the water-intake portion 151. The other end portion of the pipe 153 is connected to a pump 155 via a control valve 154. Further, the pump 155 is connected to a water spraying device 156 via a pipe. The pipe passes through the bottom wall of the water tank in a watertight manner. The water spraying device 156 is disposed in position near the bottom surface in the water tank and above the boundary surface between the refrigerant 501 and cold water.

A water/liquid separation device 157 is connected to a supply pipe 158 which is connected to the storage portion 150a via a pump 159. The water/liquid separation device 157 intakes the refrigerant 501 from the storage portion 150a and the refrigerant in the water/liquid separation device 157 is compressed by the pump 159. The water/liquid separation device 157 separates water from the compressed refrigerant 501 and supplies the refrigerant to a refrigerator 160. The water separated by the water/liquid separation device 157 is returned into the water tank via a control valve 161.

The refrigerator 160 is disposed in the same position level as the water tank 150. The refrigerator 160 serves to cool the refrigerant 501 from which water is removed by the water/liquid separation device 157. A discharging pipe 162 which is formed to pass through the side wall of the water tank in a watertight manner is connected to the refrigerator 160. A flow meter 163, flow control valve 164 and check valve 165 are connected in this order to the discharging pipe 162. A nozzle 166 is connected to the end portion of the discharging pipe 162 which is disposed inside the water tank. In this case, the nozzle 166 has at least one discharging hole. The nozzle 166 is disposed in position above the water spraying device 156. The nozzle 166 is separated at least 0.5 m from the bottom surface of the water tank or the boundary surface between the water and the refrigerant. The direction and discharging speed of the nozzle 166 are determined so as not to prevent the refrigerant 501 discharged from the side portion of the water tank from reaching the water spraying device 156. Thus, the refrigerant 501 cooled by the refrigerator 160 is injected from the injection nozzle 166 into the cold water in the water tank 150 via the flow meter 163, flow control valve 164 and check valve 165.

If the operation of the liquid supply pump 159 of the refrigerator 160 is interrupted for some reasons, the cold water 500 in the nozzle 166 flows backward in the circulating system of the cold refrigeration 501. In this case, there occurs a possibility that freezing or solidification occurs inside the internal portion of the circulating system. The check valve 165 is provided to solve the above problem that freezing or solidification occurs inside the internal portion of the circulating system. A cold water supply pipe 167 is formed to pass through the upper portion of the water tank 150 and extend downwardly into the water tank. A water-intake pump 168 is mounted on the end portion of the cold water supply pipe 167 inserted into the water tank. Further, the end portion of the cold water supply pipe 167 lying outside the water tank is connected to a separation device 169. Like the water/liquid separation device 157, the separation device 169 utilizes the separation process according to the difference between the densities by use of the centrifugal force. When supplied with cold water in the water tank drawn by the water-intake pump 168, the separation device 169 removes the refrigerant 501 contained in the received cold water and supplies the cold water to an air-conditioning load 170 via a water supply pipe 171. A calorimeter 172 for measuring the amount of heat consumed by the air-conditioning load 170 is disposed in the water supply pipe 171. The air-conditioning load 170 is not necessarily limited to a single system, and in most cases, a plurality of systems are independently disposed.

Further, a water spray device 174 is arranged in a space in the upper portion of the water tank 150. The water spray device 174 feeds back the cold water subjected to the heat exchange by the air-conditioning load into the water tank via a returning pipe 173. The spraying device 174 has a plurality of cold water spraying ports.

The intermediate portion of the water supply pipe 171 for connecting the separation device 169 to the air-conditioning load 170 is branched. The branched portion is connected to the returning pipe 173 via a bypass pipe 175. A flow control valve 176 and a pump 177 are provided in the pipe 175. The pipe 175, flow control valve 176 and pump 177 are combined to construct a water supply temperature adjusting line.

An air-conditioning control device 178 controls the above various pumps, control valve, separator, refrigerator according to the temperatures of various points and the position of the boundary surface between the refrigerant 501 and water. By the above control operation, the air-conditioning in the building and the operation of the various devices in the heat supply plant can be controlled. Further, in this embodiment, the open/closed state of the valve 154 is controlled by the air-conditioning control device 151. Thus, the water-intake portions 151 are controlled to be sequentially activated in each preset period so as to store the ice 502 uniformly in the water tank. Further, the refrigerant 501 can be automatically supplemented by use of a supplementing device (not shown).

Next, the operation of the ice heat accumulation device with the above construction is explained, but the explanation for the same process as explained in the former embodiment is omitted and only the particular process in this embodiment is explained. The ice heat accumulation device with the above construction shown in this embodiment is effective when it is used in a place where no limitation is imposed on the height, for example, when it is disposed on the rooftop of a building since the water tank 150 is made long in the height direction. That is, the volume of the ice making portion (a portion below the injection nozzle 166) in the water tank can be made relatively small in comparison with that of the ice storing portion (a portion above the injection nozzle 166). Therefore, the ice-filled rate can be enhanced.

Further, when the flow control valve 154 is opened and the pump 155 is operated, water near the sherbet-state ice 502 is sprayed into the water tank by the water spraying device 156 and upward flow of water is created in the water tank. Therefore, fine particles of ice 502 are carried by the flow of water sprayed from the water spraying device 156, rise to the upper portion of the water tank, and are combined with the assembly of the sherbet-state ice 502.

Thus, the ice assembly 502 grows, and water sprayed from the returning pipe 174 is passed through the ice assembly 502 to increase the assembling density of the ice assembly. As a result, the filling rate of the ice 502 is increased, thereby enhancing the space efficiency of the device.

Cold water drawn by the water-intake pump 168 flows into the separation device 169 via the supply pipe 167. Then, the refrigerant 501 contained in the cold water although small in amount is separated by application of the centrifugal force in the separation device 169 in the same manner as in the water/liquid separation device 157 and collected. As a result, high purity cold water is supplied to the air-conditioning load 170. Thus, the refrigerant 501 can be prevented from flowing into the air-conditioning load 170. As a result, the ice making operation can be stably effected for a long period of time.

The water subjected to the heat exchange with the air-conditioning load 170 is returned to the spraying device 174 and then sprayed over a wide area on the ice assembly 502. The water intake position by the water-intake pump 168 is set in substantially the same position as the mounting position of the injection nozzle 166 so that the thawing efficiency can be kept high.

Further, the refrigerant 501 is supplied to the refrigerator 160 via the water/liquid separation device 157 by the operation of the circulating pump 159. Even if the operation of the circulating pump 159 is interrupted for some reasons when the refrigerant 501 cooled by the refrigerator 160 is injected into the water tank by the injection nozzle 166, cold water in the water tank can be prevented from flowing into the circulating system by the operation of the check valve 165 provided in that portion of the discharging pipe 162 which lies between the refrigerator 160 and the injection nozzle 166, thereby making it possible to prevent occurrence of solidification in the circulating system.

As described above, in this embodiment, the device can be safely operated with high efficiency like the first embodiment, the controllability is excellent, the construction is simple, the maintenance is easy, and the thawing efficiency is high, and thus an ice heat accumulation device whose usability is high can be obtained. Particularly, the device of this embodiment is effective when used in a place where no severe limitation is imposed on the height thereof or on the rooftop of a building.

Next, in the above embodiment, the measure taken to prevent freezing in the injecting portion of the injection nozzle 166 is explained with reference to FIGS. 15 to 17. In a case where the second liquid (refrigerant) cooled to a temperature lower than the solidifying point (freezing point) of the first liquid (cold water) is injected into the cold water, the temperature of the injecting end portion of the injection nozzle is set to the same temperature of the refrigeration if no measure is taken. Therefore, the cold water in contact with the injecting end portion is frozen. As a result, the ice 502 starts to grow in a tubular form with the frozen water as a core. If the condition is kept unchanged, no serious problem will occur, but if fine ice particles formed and suspended in the water of the water tank or curdy combination of ice particles is attached to the tubular-form ice 502 while being suspended, the ice further grows, thereby making a problem. As a result, a large mass of ice 502 is formed with the nozzle set at the center. Then, the heat accumulation medium of low temperature leaks into the internal portion of the nozzle. The ice 502 is hard and low in temperature and has no thawing ability, thereby lowering the ice making efficiency.

Therefore, it is extremely important to prevent solidification or freezing of the cold water in the nozzle portion. FIG. 15 shows the structure of a double spraying nozzle with a convection preventing plate and a path for supplying the refrigerant for the nozzle. As shown in FIG. 15, the supply system for the refrigerant 501 is constructed by two branch lines including a line 158a for supplying the refrigerant which is compressed by the pump 159 to a refrigerator (not shown) and a line 158b formed to extend to the water tank. The injection nozzle 166 includes a central nozzle 166a for injecting a refrigerant, an outer nozzle 166b for injecting a refrigerant of relatively high temperature, and a convention preventing plate 166c formed in substantially the same plane as the above nozzles and integrally formed with the outer nozzle 166b. In this case, a plurality of injection nozzles 166 with the above construction are provided in the water tank. Single nozzle headers 166d, 166e for supplying refrigerants to the respective nozzles may be commonly provided for a group of nozzles. Further, the line for supplying the refrigerant of low temperature from the refrigerator and the nozzle portion are thermally insulated.

When the above freezing preventing means is provided for the injection nozzle 166, the refrigerant of relatively high temperature is injected in such a form to surround the refrigerant of low temperature. Therefore, the front end portion of the nozzle at the low temperature is not set in contact with the cold water, thereby making it possible to prevent the solidification in the nozzle portion by the cold water attached thereto.

FIG. 16 shows the structure having an electric heater 166h as the freezing preventing means for the injection nozzle. Like the case of FIG. 15, in the case shown in FIG. 16, the convection preventing plate 166c is disposed in the same plane as the refrigerant injection nozzle. The electric heater 166h is disposed on the front end portion of the nozzle which is set in direct contact with the water in the water tank. Cables 166i are connected to the electric heater 166h so that the electric heater can be energized by the external power source (not shown). In this example, since the electric heater 166h and cables 166i are used in the water, they are waterproofed and the cables 166i are laid mainly inside the heat insulation material 166f of the pipe line and then lead out to the exterior.

By using the above freezing preventing means and energizing the electric heater 166h to heat the front end portion of the nozzle, the temperature of the front end portion can be kept at a temperature higher than the freezing point of the cold water so that the cold water can be prevented from being frozen. In this case, the electrical heating may be effected continuously or periodically, but if it is excessively heated, the ice making loss occurs, and therefore, it is desirable to adjust the surface temperature of the electric heater 166h to be set several degrees C (°C.) higher than the freezing point of the cold water.

FIG. 17 shows the structure having a mechanism for mechanically wiping the front end surface of the nozzle as the freezing preventing means for the injection nozzle. As shown in FIG. 17, a freezing preventing wiper mechanism 166j which is the same as the mechanism for wiping the windshield of a car is disposed on the convection preventing plate 166c arranged on the front surface of the injection nozzle 166.

With the injection nozzle having the above freezing preventing means, the ice 502 can be mechanically wiped away before the cold water freezes and grows on the nozzle portion by always operating the wiper mechanism 166j. Thus, adhesion of the ice due to the freezing of the cold water can be prevented. Particularly, the wiper mechanism is effective when the electrical heating is not effected. When the wiper mechanism 166j is used together with the structure shown in FIG. 15 or 16, a more significant effect can be attained.

Figure 15:
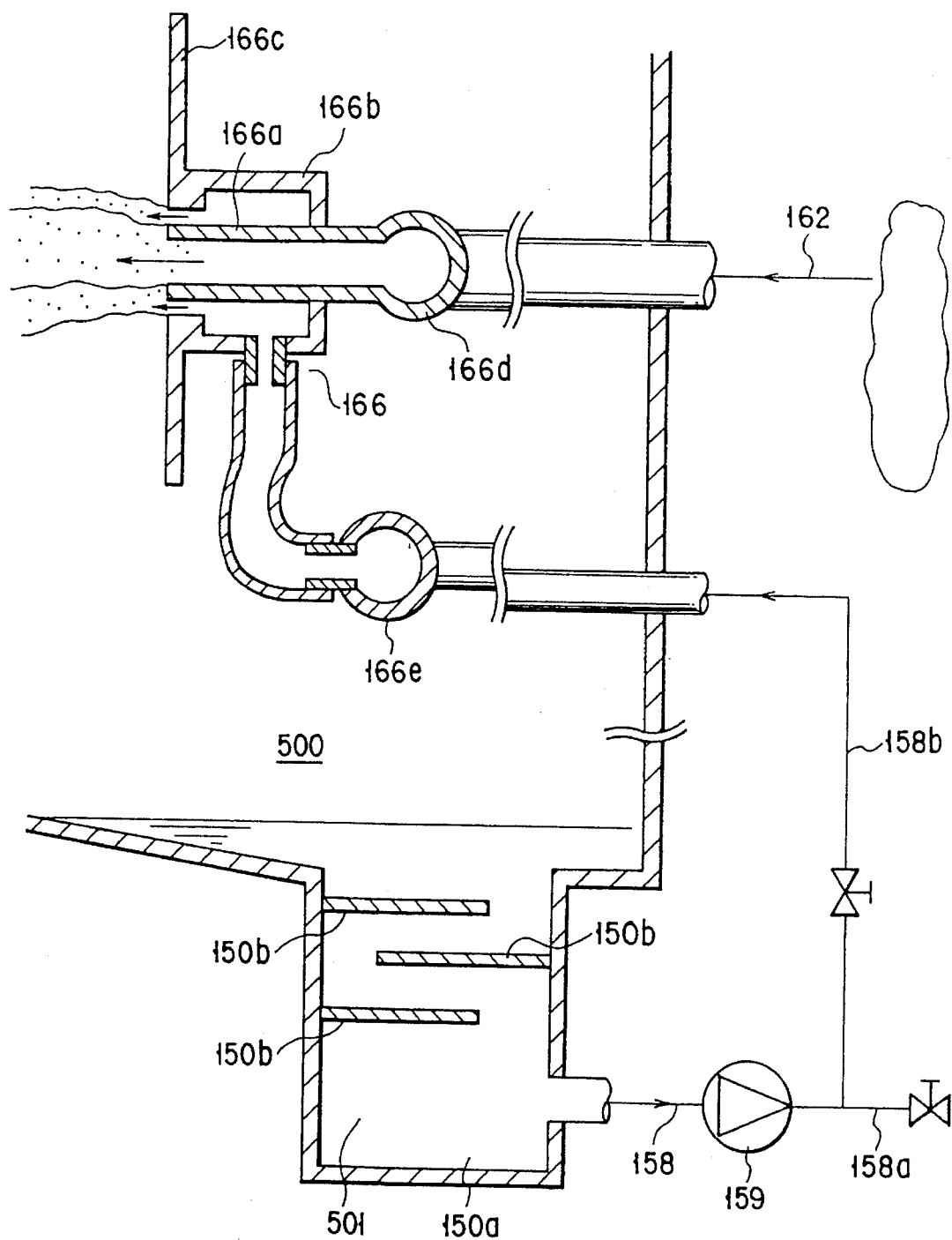
FIG. 15 is a cross sectional view showing a first example of the construction of an outlet nozzle portion for refrigerant used in the latent heat accumulation system of the same embodiment.

Thus, as shown in FIGS. 15 to 17, the sherbet-state ice 502 can be stably and continuously obtained with high efficiency by using a structure for preventing the freezing of cold water on injection nozzle by use of warm fluid, electric heater or mechanical wiper.

Further, this invention is not limited to the constructions shown in the above embodiments, and various modifications can be obtained to further enhance the function thereof by replacing part of the construction by the other part or adding the other part to the construction.

Examples of the modifications are explained below.

(1) In the above embodiment, a fluorinert-series inactive liquid which does not contain hydrogen and chlorine and has characteristics that the specific gravity is equal to or larger than 1.7 at 0° C., the solidifying point is −30° C. or lower and the boiling point is 75° C. or higher may be used as the second liquid.

(2) In the above embodiment, a fluorinert-series inactive magnetic fluid which does not contain hydrogen and chlorine and has characteristics that the specific gravity is equal to or larger than 1.7 at 0° C., the solidifying point is −30° C. or lower and the boiling point is 75° C. or higher may be used as the second liquid. In this case, a magnetic field generation device may be disposed near the injection nozzle to speed up separation between the magnetic fluid and water.

(3) In the above embodiment, it is possible to provide a circulating system exclusively used for the first liquid for measuring the temperature of water in the water tank and supplying the water from the water tank to the refrigerator, cooling and collecting the water according to the measured temperature.

(4) In the above embodiment, a supply/collection system for supplying the refrigerant cooled by the refrigerator to a plurality of water tanks is mainly constructed by pipes, pumps and switching control valves. The refrigerant may be supplied/collected to or from the plurality of water tanks simultaneously or with time delay by controlling the supply/collection system by use of the air-conditioning control device. In this case, the switching operation of the supply/collection system may be automatically effected according to the amounts of ice made and stored in the respective water tanks or a signal output from a measuring unit for measuring the temperature of water in the water tanks.

(5) In the above embodiment, an accumulation mechanism for accumulating ice made in the water tank is disposed in the water tank. A mixture of water and ice which is accumulated by the ice accumulation mechanism and whose filling rate is relatively high is fed to a carrying system constructed by pipes and pumps. Thus, the mixture (fluid) can be fed to a desired destination, and it becomes possible to feed the ice and water in the two-phase flow state to a storing water tank or cooling load disposed at a remote place or high place.

Figure 18:
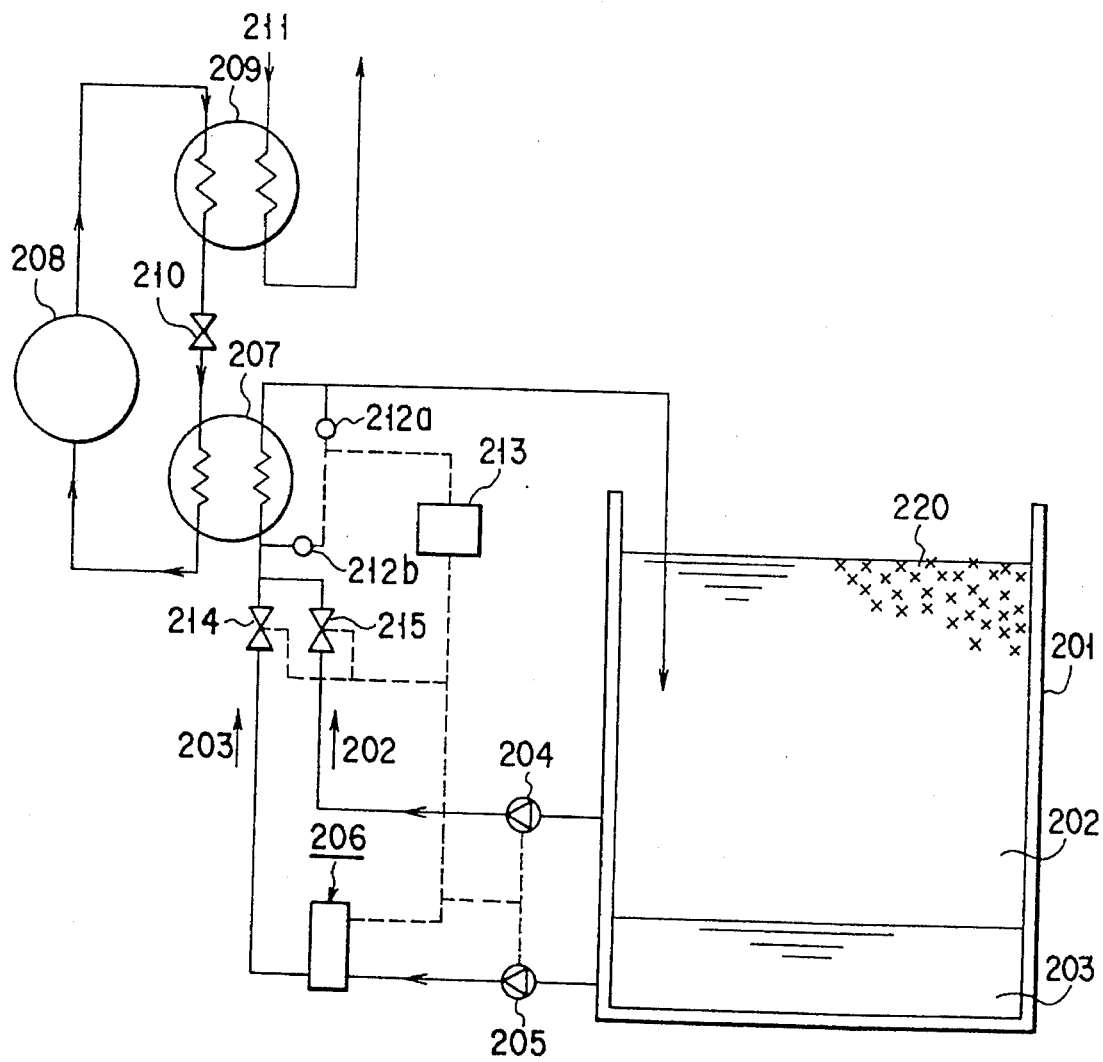
FIG. 18 is a view showing the construction of one embodiment of this invention.
Figure 21:
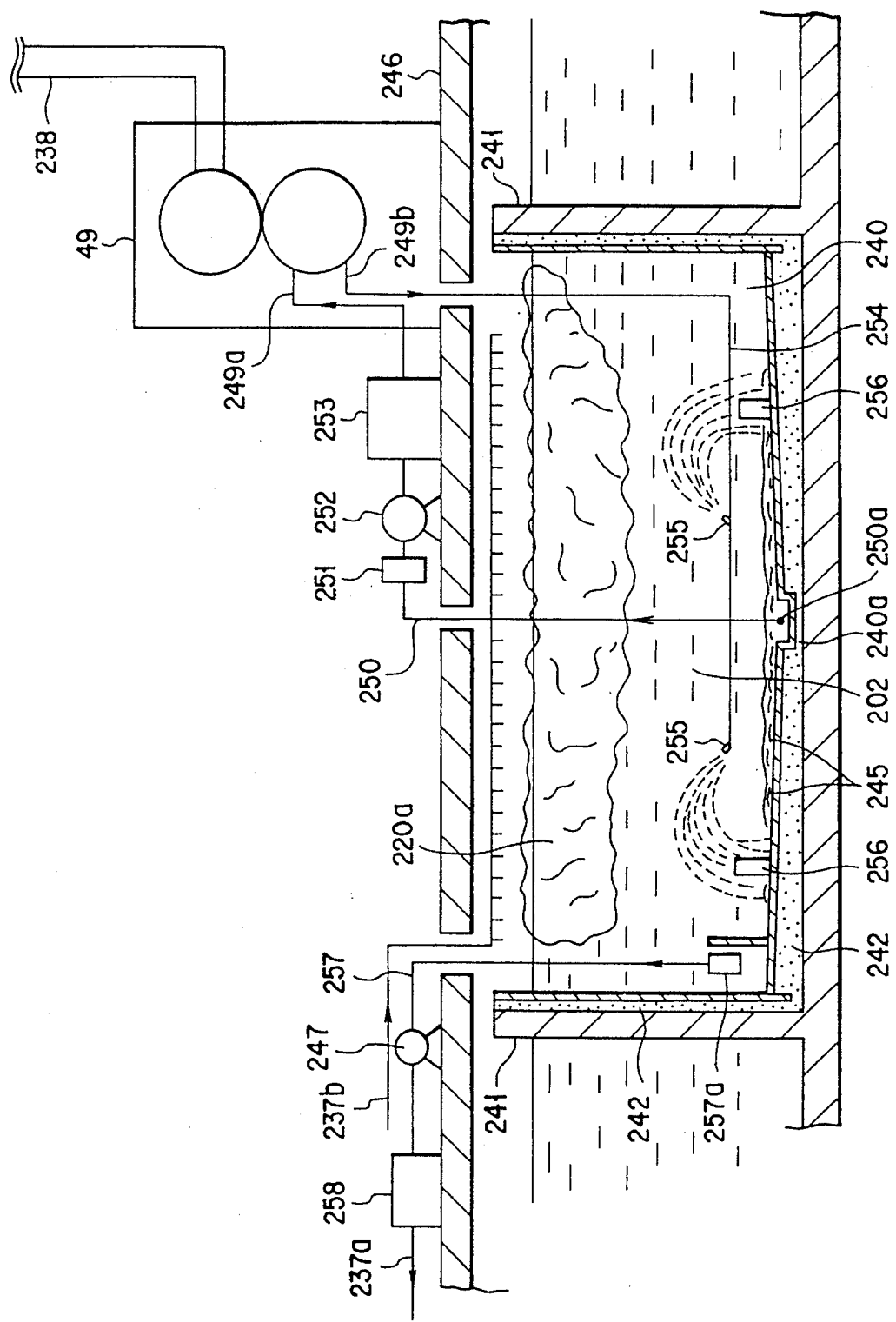
FIG. 21 is a view showing the construction of still another embodiment of this invention applied to an air-conditioner shown in FIG. 9.

Next, another embodiment of this invention is explained with reference to the accompanying drawings. FIG. 18 is a view showing the construction of the embodiment of this invention. As shown in FIG. 18, water 202 and a non-freezing liquid (refrigerant) 203 which is not water-soluble and has a specific gravity larger than 1 are stored in a water tank 201. A water pump 204 is connected to the side portion of the water tank 201 in an intermediate position in the height direction to circulate the water. A non-freezing liquid pump 205 is connected to the side portion of the water tank 201 in a lower position in the height direction to circulate the refrigerant. An evaporator 207, compressor 208, condenser 209 and expansion valve 210 constitute the main portion of the refrigerator. The heat of cold water 211 is radiated via a radiator (not shown) of the condenser 207. The non-freezing liquid pump 205 is connected to the evaporator 309 via a separation tank 206 and electromagnetic valve 214. The water pump 204 is connected to the evaporator 207 via an electromagnetic valve 215. A temperature detector 212a serves to detect the temperature of water 202 in the outlet port of the evaporator 207. A temperature detector 212b serves to detect the temperature of water 202 in the inlet port of the evaporator 207. A reference numeral 203 denotes a control device.

The separator 206 has a porous floating plate 217 which is formed of a material having a specific gravity smaller than that of the non-freezing liquid 203 and larger than that of the water 202 and is set to float in the boundary surface between the water 202 and non-freezing liquid 203 in a tank 216 as shown in FIG. 19. When water 202 is accumulated in the tank 216 and the floating plate 217 sinks and reaches a preset height, the position of the floating plate is detected by a detector 218. Then, the detector outputs a signal to cause the control device 213 to open an electromagnetic valve 219 disposed on the upper portion of the tank 216, thereby draining the water. Pipes respectively connected to the non-freezing liquid pump 205 and electro-magnetic valve 214 are provided in the lower portion of the tank 216. Further, an opening (not shown) which is in communication with an atmosphere is formed in the upper wall of the tank 216.

Next, the operation of the embodiment with the above construction is explained. When the temperature of the water 202 in the water tank 201 is high (20° to 30° C.), the electromagnetic valve 215 is opened and the water pump 204 is driven to draw out the water 202 stored in the water tank 201 and supplies the same to the evaporator 207. At this time, the non-freezing liquid pump interrupts its own operation and the electromagnetic valve 214 is closed. The outlet temperature (or inlet temperature) of the water 202 of the evaporator 207 is detected by the temperature detector 212a (or temperature detector 212b), and when the detected temperature is lowered to a level (which is different according to the capacity of the refrigerator and is 3° to 5° C., for example) close to and above the solidifying point of the water 202, the electromagnetic valve 215 is closed, the operation of the water pump 204 is interrupted, the electromagnetic valve 214 is opened, and the non-freezing liquid pump 205 is driven to supply the non-freezing liquid 203 collected from the lower portion of the water tank 201 directly to the evaporator 207 under the control of the control device 213. The cooled non-freezing liquid 203 is directly injected into the water 202 in the water tank 201. As a result, the water 202 is cooled and ice 220 is made. When the water 202 is accumulated and rises to a high level in the separator 206, the electromagnetic valve 219 is opened to drain the water (to the water tank 201 or to the exterior).

According to the embodiment with the above structure, in a case where water of high temperature is cooled, the water in the water tank can be rapidly cooled and the performance of the refrigerator can be utilized to the maximum degree since water which is excellent in the heat carrying property can be directly supplied to the evaporator.

This invention is not limited to the above embodiment and can be modified as shown in FIG. 20. The embodiment shown in FIG. 20 is similar to the above embodiment except that an ice maker 221 is disposed in position higher than the water tank 201, the inlet port of a non-freezing liquid pump 205 is connected to the bottom portion of the ice maker 221, a pipe is disposed on the outlet port side of the water pump 204 to extend in parallel to the pipe connected to the evaporator 207, and the pipe is connected to the ice maker 221 via an electromagnetic valve 222. The inlet port side of the water pump 204 is connected to the side portion of the water pump 204 in a lower position in the height direction. The compressor, condenser and expansion valve are not shown.

Next, the operation of the embodiment is explained. When the temperature of the water 202 in the water tank 201 is high (20° to 30° C.), the electromagnetic valve 215 is opened and the water pump 204 is driven to draw out the water 202 from the side portion of the water tank 201 and supply the same to the evaporator 207 which in turn cools the received water, and the thus cooled water is fed into the water tank 201 via the ice maker 221. At this time, the electromagnetic valve 214 is closed. Like the case of the above embodiment, when the temperature detected by the temperature detector 212a (or temperature detector 212b) is lowered to a level close to and above the solidifying point of the water, the electromagnetic valve 215 is closed and the electromagnetic valve 222 is opened to supply the water 202 into the ice maker 221. Next, the electromagnetic valve 214 is opened and the non-freezing liquid pump 205 is driven to supply the non-freezing liquid 203 collected from the lower portion of the ice maker 221 to the evaporator 207. The non-freezing liquid 203 cooled in the evaporator 207 is injected into the ice maker 221 so as to be brought into contact with the water 202, and as a result, the water 202 flowing into the ice maker 221 will be cooled and ice 220 can be made. The cooled water 202 and the thus formed ice 220 are supplied into the water tank 201. Therefore, in this embodiment, the same effect as in the above embodiment can be obtained.

Next, another embodiment of this invention is explained with reference to FIGS. 21 to 24. The embodiment shown in FIGS. 21 to 24 can be applied to the multistoried building shown in FIG. 9. FIGS. 21 to 24 show a water tank disposed in the basement of the multistoried building.

A water tank 240 is divided into compartments by a plurality of partition plates 241 having communication holes (not shown) formed therein, a heat insulating layer 242 is formed on the bottom portion and inner side walls of each compartment, and the bottom portion has an inclined surface and a groove 240a in the lowest portion in which a magnetic fluid which will be explained later is deposited by its own weight and collected. A water pipe 243 for supplying heat to the neighboring multistoried buildings (not shown) is connected to the water tank 240a via a water conveying device and closing valve (not shown). The water pipe 243 is laid via an underground multi-purpose duct 244. Water 202 and a magnetic fluid 245 which is a non-freezing refrigerant, which is not water-soluble and which has a specific gravity larger than the water 202 are mixed and stored in the water tank 240. Since the magnetic fluid 245 has a specific gravity larger than the water 202, it is generally deposited in the bottom portion of the water tank 240 including the groove 240.

A floor 246 is formed on the upper portion of the basement of the multistoried building to cover the water tank section including the water tank 240. A pump 247 and a heat pump 248 constituting a cold/warm water supply system are disposed on the floor 246. The pump 247 and heat pump 248 are connected to the supply pipe 237a and return pipe 237b via a valve (not shown). Further, a refrigerator 249 is disposed on the floor 246. The evaporator inlet port 249a of the refrigerator 249 is connected to a supply pipe 250 which has a suction port 250a for the magnetic fluid 245 or refrigerant formed at the front end portion and which is formed to extend into the groove 240a in the bottom portion of the water tank 240. The supply pipe 250 is connected to a strainer 251, pump 252 and water separation device 253 in this order. Further, the evaporator outlet port 249b of the refrigerator 249 is connected to a discharging pipe 254 which is disposed to horizontally extend near the bottom surface of the water tank 240. A plurality of injection nozzles 255 are connected to the front end portion and intermediate portion of the horizontally extending portion of the pipe 254 with the injection direction set in the upward oblique direction at a preset angle. Magnetic field generation devices 256 are disposed below the injection nozzles 255. The magnetic field created by the magnetic field generation device 256 acts on the magnetic fluid 245 discharged from the injection nozzle 255 so that the magnetic fluid can be rapidly deposited on the bottom surface after the magnetic fluid 245 is subjected to the heat exchange with the water 202.

Figure 23:
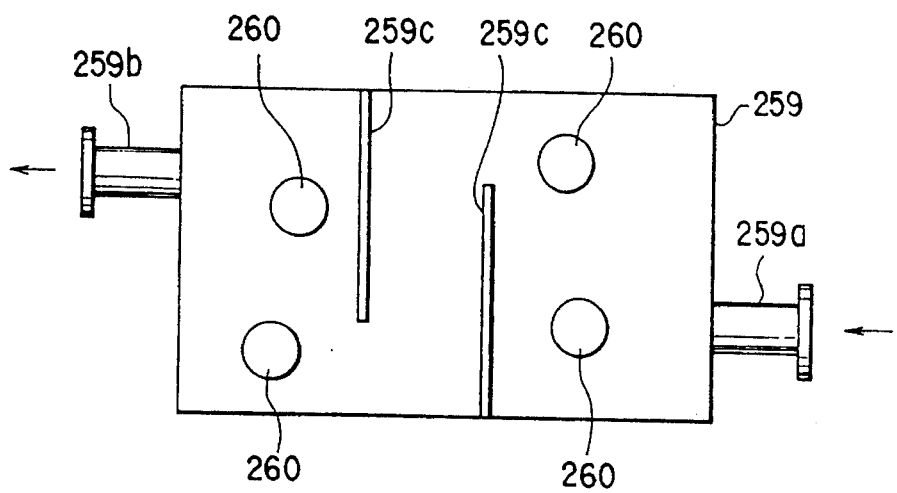
FIG. 23 is a plan view showing the construction of a separation tank used in the embodiment shown in FIG. 21.
Figure 24:
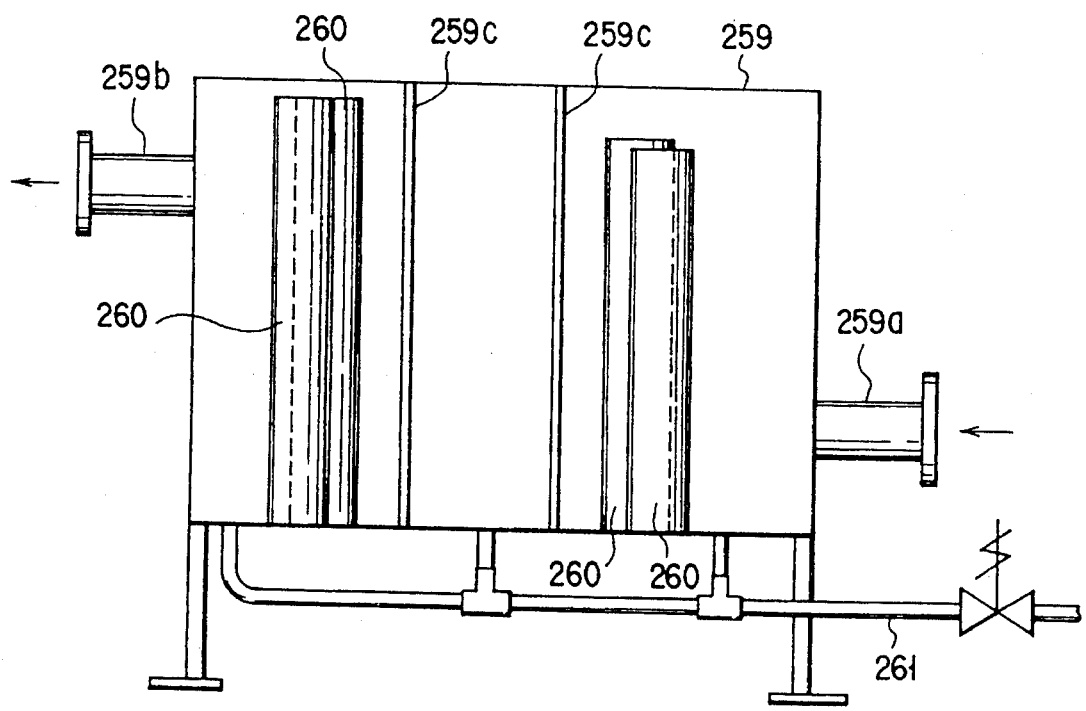
FIG. 24 is a cross sectional view of the tank shown in FIG. 23.

A water-intake pipe 257 of the cold water circulating system for supplying water 202 drawn out from the water tank 240 to a multistoried building 230 or neighboring multistoried buildings (not shown) is disposed to extend to a position near the bottom surface of the water tank 240. A water-intake portion 257a is mounted on the front end portion of the water-intake pipe 257, and the water-intake pipe 257 is connected to the pump 247 and to a separation tank 258 for the magnetic fluid 245. The separation tank 258 serves to attract and separate the magnetic fluid 245 contained in the water 202 although small in amount by the magnetic action and collect the thus separated magnetic fluid. As shown in FIGS. 23 and 24, an inlet pipe 259a connected to the water-intake pipe 257 and an outlet pipe 259b connected to the supply pipe 237a for the air-conditioning circulating water are formed in the respective side walls of the separation tank 258. The separation tank 258 includes a tank 259 having partition plates 259a and 259b formed in the central portion thereof to curve the passage, a plurality of magnetic field generation devices 260 disposed in the tank 259, and a collection pipe 261 for collecting magnetic fluid 245 attracted and separated by the magnetic field generation devices 260.

The magnetic field generation device 256 disposed near the injection nozzle 255 and the magnetic field generation device 260 disposed in the separation tank 258 of the water-intake pipe 257 in the cold water circulating system use electromagnets. The operation of the magnetic field generation devices 25.6 and 260 can be freely turned on or off by the electrical ON/OFF control. However, the magnetic field generation device 260 is constructed by a combination of a permanent magnet and an electromagnet which are concentrically disposed, for example, and the magnetic field is set up only by the permanent magnet in the normal time and when a certain amount of magnetic fluid 245 contained in the circulating water is trapped, the electromagnet is energized to cancel the electromagnetic field by the permanent magnet.

Therefore, in the magnetic field generation device 260, the magnetic fluid 245 is trapped only by the permanent magnet without energizing the electromagnet in the normal mode. However, when the trapped magnetic fluid 245 is collected, the electromagnet is energized to extinguish the magnetic field by the permanent magnet. Thus, the magnetic field generation device 260 releases the trapped magnetic fluid 245. The released magnetic fluid 245 is returned from the collection pipe 261 connected to the bottom portion of the separation tank 258 to the bottom portion of the water tank 240 via a pipe and pump (not shown). This operation is effected while the operation of the pump 247 is interrupted.

Next, the operation of the embodiment with the above construction is explained. As shown in FIG. 22, the magnetic fluid 245 injected from the injection nozzle 255 is actively mixed with the water 202 and subjected to the heat exchange with the water by the action of the magnetic field created by the magnetic field generation device 256 disposed near the injection nozzle 255 for the magnetic fluid 245. However, the magnetic fluid 245 will not be suspended, guided along the magnetic field by the magnetic field generation device 256 and deposited on the bottom portion of the water tank 240. The magnetic field generation device 256 attracts and holds a certain amount of magnetic fluid 245. However, that part of the magnetic fluid 245 which has been deposited on the bottom portion is sequentially supplied to the refrigerator 249 via the supply pipe 250, cooled again, and then injected from the injection nozzle 255.

Even if the separation operation for the magnetic fluid 245 is effected, some of the magnetic fluid 245 may be still suspended in the water or sherbet-state ice 220a although small in amount. The suspended magnetic fluid 245 is trapped by the magnetic field generation device 260 disposed in the separation tank 258 of the water-intake pipe 257 in the cold water circulating system.

The trapped magnetic fluid 245 is attracted by permanent magnet of the magnetic field generation device 260 and accumulated on the lower surface portion thereof. The accumulated magnetic fluid 245 may be fed back into the bottom portion of the water tank 240. That is, when the operation of the suction pump 247 in the cold water circulating system is interrupted in a period in which no cooling load is applied, for example, during nighttime hours, the electromagnet in the magnetic field generation device 260 is energized to cancel the magnetic field generated by the permanent magnet of the magnetic field generation device 260 so as to extinguish the magnetic fluid attracting force of the magnetic field generation device 260. Thus, the magnetic fluid 245 can be returned to the bottom portion of the water tank 240 via the collection pipe 261 connected to the bottom portion of the separation tank 258. In the above explanation, the magnetic field generation device 260 disposed in the separation tank 258 is constructed by a combination of the permanent magnet and electromagnet which is selectively energized, but it is also possible to construct the magnetic field generation device 260 only by use of an electromagnet.

According to the embodiment with the above construction, a water tank for storing cold water together with a non-freezing liquid which is not water-soluble and has a specific gravity larger than water is disposed in the basement or on the rooftop of a multistoried building or neighboring outdoors. In an air-conditioning device including a water circulating system for forcedly circulating and supplying the water in the water tank to respective rooms of the building and a refrigerant circulating system for drawing the refrigerant from the water tank, cooling the same in a refrigerator and then returning the cooled refrigerant to the water tank, only the heat accumulation refrigerant is cooled in the refrigerator by use of cheap electric power during nighttime hours. The refrigerant is circulated in the water tank and subjected to the heat exchange with the water so as to partly change the water into sherbet-state ice and store heat in this state. During daytime hours, cold water is circulated into the rooms of the building to cool the respective rooms. The returned water which has become warm is mixed into the sherbet-state ice to melt the ice so as to enhance the heat exchange efficiency. In an ice heat accumulation device in which the water tank is made small and lightweight, since a magnetic fluid is used as the heat accumulation refrigerant and a magnetic field generation device is used, the problems which are caused by the emulsion occurring after the heat accumulation refrigerant is injected into the water and the suspension phenomenon of the heat accumulation refrigerant for a long period of time in the conventional case can be prevented.

Further, since a separation tank having the magnetic field generation device is disposed in the water supply section of the cold water circulating system to trap a magnetic fluid which is a heat accumulation liquid remaining although small in amount in the cold water supplied to the cooling load, the leakage of the magnetic fluid into the cold water circulating system can be prevented, thereby making it possible to attain the long-term stable operation.

As described above, according to this invention, since a passage switching device is provided between the refrigerator and the water tank, the water can be cooled from a high temperature of the water set when it is in the water tank to a temperature near the freezing point by directly supplying the water into the refrigerator, the performance of the refrigerator can be fully utilized, the water can be efficiently cooled and ice can be efficiently made. Further, the magnetic fluid is used as a non-freezing liquid and the magnetic field generation device is used in the water tank. Therefore, when the magnetic fluid cooled in the refrigerator is injected into the water tank, it cools the water, and when fine ice particles are formed, the magnetic fluid is attracted and separated by the magnetic field generation device. As a result, the problems which are caused by the emulsion occurring after the non-freezing liquid is injected into the water and the suspension phenomenon of the non-freezing liquid for a long period of time in the conventional case can be prevented, and the heat exchange efficiency can be enhanced and the device can be made small and lightweight.

Next, still another embodiment of this invention is explained with reference to FIGS. 25 and 26. As shown in the drawing, a refrigerant (such as Fluorinert) 501 which is a second liquid is drawn out by use of cheap electric power during nighttime hours and a pump 301 is driven to supply the refrigerant to a refrigerator 302. After the second liquid is cooled to a temperature lower than the solidifying point or freezing point (0° C.) of a first liquid which is water, the second liquid is injected from a plurality of nozzles 305 into the water 500 in a plurality of ice making tanks 303 simultaneously or with time delay. Thus, the cold of a heat accumulation liquid 501 is given to the water 500.

the nozzles 305 are disposed in positions which are sufficiently high to permit the refrigerant 501 injected into the ice making tank to be subjected to the full heat exchange with the water 500. That is, the nozzles 305 are disposed in positions approx. 0.5 m apart from the boundary surface between the first and second liquids. Therefore, the temperature of the refrigerant 501 rises to substantially the same temperature as the water (0° C. in the ice making state) by the time it reaches a storage portion 307 and the heat exchange efficiency by the refrigerant becomes approximately 100%.

In the ice making tank 303, sherbet-state ice 308 is stored in the from of cloud in the upper portion 309. At this time, the volume filling rate of the ice is higher in a portion nearer to the water surface. Thus, during the ice making process, the refrigerant 501 is supplied together with the cold water 500 from a storage portion 312 for the heat accumulation liquid 501 formed in the bottom portion of an ice storage tank 310 into the making tank 303 via pipe 313 and pump 314. As a result, the water level in the ice making tank 303 gradually rises. In this case, the water level in the ice storage tank 310 falls, but since the volume of the ice storage tank 310 is several times larger than that of the ice making tank 303, the degree of lowering in the water level in the storage tank is small.

When it is detected that the water level in the ice making tank 303 rises and reaches a preset level by means of a water level sensor 315 disposed in a preset position, a water gate plate 318 of a water gate portion 317 is moved downwardly and the sherbet-state ice 308 in the upper portion 309 of the ice making tank 303 flows as one unit into the ice storage tank 310 via a connecting portion 316. The connecting portion 316 is so formed as to have a downward path from the ice making tank 303 to the ice storage tank 310 so that the ice can smoothly flow into the ice storage tank without being stopped on the halfway.

The water gate plate 318 of the water gate portion 317 is gradually raised when water in the lowermost portion of the water gate portion 317 will completely have flowed out, and then water 500 is accumulated again. During this time, the ice making process is continuously effected.

As described above, in the above embodiment, when the sherbet-state ice is transferred, the water gate is opened according to the storage state of the sherbet-state ice so as to move the ice at one time into the ice storage tank as a mass of ice like avalanche without lowering the volume filling rate of the ice. Therefore, the driving force necessary for transferring the ice is only the pumping power required for transferring water from the ice storage tank to the ice making tank, and since the mechanism of upward or downward movement of the water gate plate is used to permit the sherbet-state ice to move by its own weight, it is not necessary to transfer the ice without using a complicated transferring means. Further, if the water gate is formed to be long in the horizontal direction, it becomes possible to prevent the ice from being unwantedly broken and prevent water from separately flowing into the ice storage tank.

In the above-described latent heat accumulation systems shown in FIGS. 8 to 24 which are not provided with ice transferring mechanisms and in a latent heat accumulation system having an ice transferring mechanism as shown in FIGS. 25 and 26, a second fluid, which does not combine with a first fluid, has a specific gravity greater than that of the first fluid and is cooled to a preset temperature level is injected into the first fluid. Thus, a solid phase material of the first fluid is produced by the solidification phenomenon and the latent heat of the solid phase material is used to cool a to-be-cooled object. Specifically, these latent heat accumulation systems employ, as a heat medium, an antifreezing fluid such as an oily liquid or a fluorine-based inactive liquid which is non-water-soluble, has a greater specific gravity than water, and is cooled to 0° C. or below by a refrigerating machine. The antifreezing fluid is, for example, a two-element liquid of fluorine and carbon, e.g. Fluorinate (trade name). The antifreezing liquid is injected into water in a water tank, and heat exchange is carried out by direct contact between the antifreezing liquid and the water. By the heat exchange, part of the water is stored as sherbet-state ice. The antifreezing liquid is recovered from a lower part of the water tank and ice production is continued.

Attention has been paid to the fluidity of the sherbet-state ice produced in the latent heat accumulation system adopting the above ice producing method, and various systems have been devised for transferring the ice along with water to a remote place. The system shown in FIGS. 25 and 26 is an example of the latent heat accumulation system having the ice-transferring mechanism.

In these systems, however, when sherbet-state ice stored in an ice storing tank is fed to a pump, i.e. when sherbet-state ice floating in a water tank is collected and fed to a pump, water alone enters the pump smoothly and the ice does not smoothly enter the pump.

Embodiments which will be described below relate to latent heat accumulation systems having ice-transferring mechanisms in which the above problem has been solved. Specifically, these systems are provided with highly reliable, highly efficient ice-transferring mechanisms wherein sherbet-state ice can be smoothly fed to a pipe and transferred by a pump.

FIG. 27 is a schematic diagram showing a second embodiment of a latent heat accumulation system having an ice-transferring mechanism according to the present invention. This system is provided with an ice-producing tank 350. The ice-producing tank 350 comprises an ice-producing unit 350a, a hopper unit 350b, a liquid reservoir section 350c, an upward pipe 350d and a coupling section 350e. The coupling section 350e is coupled to a transfer pipe 354. In the ice-producing tank 350, water 380 is put in direct contact with an antifreezing liquid 370 which does not combine with a first fluid, has a specific gravity greater than water and is cooled to a preset temperature level. Thus, a mass of solid phase material of the water 380, that is, a fine ice 390 (a flock ice 390a), is produced. The principle of producing the flock ice 390a is the same as that in the embodiments shown in FIGS. 8 to 26. In the ice-producing tank 350, the antifreezing liquid 370 is put in a lower part thereof, the water 380 is placed above the antifreezing liquid 370, and the flock ice 390a forms above the water 380. The flock ice 390a is transferred to a remote place via the upward pipe 350d and transfer pipe 354. In the context of this description, the water 380 includes drinking water, non-drinking water and sea-water.

The hopper section 350b and liquid reservoir section 350c formed at the lower part of the ice-producing tank 350 recover the antifreezing liquid 370 descending within the ice-producing tank 350. A two-phase stream of the water 380 and ice 390 rises through the upward pipe 350d coupled to the upper part of the ice-producing tank 350. The two-phase stream is transferred to a specified place via the transfer pipe 354 coupled to the upward pipe 350d. The two-phase stream transferred via the transfer pipe 354 is put in a reservoir tank 356 via a discharge section 355.

The system of this embodiment includes a water circulation system. The water circulation system comprises a pipe 359 and a pressure pump 360. The water 380 is output from the reservoir tank 356 via the pipe 359 and pressurized by the pressure pump 360. The pressurized water 380 is input to the ice-producing tank 350.

The system of this embodiment also includes an antifreezing liquid circulation system. The antifreezing liquid circulation system comprises a pipe 351, a pressure pump 352 and a refrigerator 353. The antifreezing liquid 370 recovered from a recovery section 350b, 350c via the pipe 351 is cooled by the refrigerator 353 and the cooled antifreezing liquid 370 is pressurized by the pressure pump 352. The pressurized antifreezing liquid 370 is injected from a nozzle 353 into the wafer 380 within the ice-producing tank 350, and put in direct contact with the water 380.

The ice-producing tank 350, hopper section 350b, liquid reservoir section 350c, upward pipe 350d and transfer pipe 354 are connected in a sealed state.

The nozzle 351a is fixed in a predetermined position at a predetermined distance above an interface of the water 380 and antifreezing liquid 370 within the ice-producing tank 350 so that maximum heat exchange can be performed between the water 380 and antifreezing liquid 370. The nozzle 351a includes a freeze-preventing mechanism on an as-needed basis. The freeze-preventing mechanism may comprise, for example, an electric heat source or a combustion heat source of natural gas. The present system includes a heat exchange system. The heat exchange system comprises a pipe 357 and a heat exchanger 358. The cooled water 380 is taken out from the reservoir tank 356 via the pipe 357 and fed into the heat exchanger 358. The heat-exchanged water from the heat exchanger 358 returns to the reservoir tank 356. The heat exchanger 358 is used as an air-conditioner in buildings.

In addition, the system of this embodiment includes a pulverizer 361 for pulverizing the flock ice within the upward pipe 350d, in particular, a mass of ice portions, and a driver 361a for driving the pulverizer 361.

FIG. 28 is a schematic diagram showing a third embodiment of a latent heat accumulation system having an ice-transferring mechanism according to the present invention.

As is shown in FIG. 28, a top portion 401a of an ice-producing column 401 is provided with an antifreezing liquid nozzle 402 such that an outlet end portion 402a is situated downward. The outlet end portion 402a of the antifreezing liquid nozzle 402 is provided with an electric heater 403 for preventing formation of ice at the tip of the nozzle 402. A water nozzle 404 for jetting water is provided near the antifreezing liquid nozzle 402 at the top portion 401a.

An antifreezing liquid recovery section 405 is hermetically coupled to the lower part of the ice-producing column 401. The recovery section 405 stores antifreezing liquid 406 such as an oily liquid or a fluorine-based inactive liquid, which is jetted from the antifreezing liquid nozzle 402 into the ice-producing column 401. The antifreezing liquid 406 is non-water-soluble and has a greater specific gravity than water. A pump 407, a flow rate control valve 409 and a refrigerator 410 are connected between the antifreezing liquid recovery section 405 and antifreezing liquid nozzle 402 by means of an antifreezing liquid pipe 411. The pump 407, flow rate control valve 409, refrigerator 410 and antifreezing liquid pipe 411 constitute an antifreezing liquid circulation system.

A measuring device 412 for measuring an interface position between the antifreezing liquid 406 and water is attached to the upper part of the antifreezing liquid recovery section 405. The measuring device 412 outputs a detection signal to control the antifreezing liquid pump 407 or flow rate control valve 409 and, where necessary, order the additional supply of the antifreezing liquid from an antifreezing liquid tank (not shown).

A vertically situated upward pipe 413 hermetically connects an upper part of the antifreezing liquid recovery section 405 and a lower part of the ice-producing column 401. The direction of extension of the downstream portion of the upward pipe 413 is changed from the vertical direction to the horizontal direction. A water extraction device 414 is provided on the downstream side of the upward pipe 413.

A two-phase stream of ice and water rises in the upward pipe 413 and then flows in the horizontal direction. The water extraction device 414 extracts water from the two-phase stream of ice and water. The water extracted by the water extraction device 414 is guided to a transfer pump 416 via an extracted water pipe 415. The extracted water is supplied from the transfer pump 416 to the water nozzle 404 as pressurized water.

The water extraction device 414 is provided with a two-phase stream filling rate measuring device 417 for measuring the filling rate of ice after water is extracted. The degree of opening of a pressure reducing valve 418 is adjusted on the basis of a detection signal from the filling rate measuring device 417. By the adjustment of the degree of opening of the pressure reducing valve 418, the flow rate of water supplied to the transfer pump 416 via the extracted water pipe 415 is controlled.

A pulverizer 424 is provided within the upward pipe 413. The pulverizer 424 pulverizes the flock ice rising in the upward pipe 413, in particular, a mass of ice portions. The pulverizer 424 is driven by a driver 424a provided outside the upward pipe 413. The above-described elements and pipes constitute an ice-producing section 419.

On the other hand, a latent heat accumulation tank 420 is situated apart from the ice-producing section. The two-phase stream of ice and water rising through the upward pipe 413 is transferred toward the latent heat accumulation tank 420 via a transfer pipe 421 and let to fall into the tank 420 from an open end portion 421a of the pipe 421.

A water port 420a is provided at a lower part of the accumulation tank 420. Water in the tank 420 is guided from the water port 420a to the transfer pump 46 via a return pipe 422. The water from the water port 420a and the water from the water extraction device 414 flow commonly into the transfer pump 416. The water from the water port 420a and the water from the water extraction device 414 are fed from the transfer pump 416 to the water nozzle 4 as pressurized water. A water circulation system is constituted by the water port 420a, return pipe 422, transfer pump 416, etc.

In the latent heat accumulation system having the above ice transfer mechanism, the ice-producing column 401, antifreezing liquid recovery section 405, upward pipe 413, latent heat accumulation tank 420 and the pipes connecting these elements are fully heat-insulated. In addition, the ice-producing section 419 is separated from the latent heat accumulation tank 420, and an auxiliary pump is provided midway along the transfer pipe 421 and return pipe 422, when a long-distance circulation is required.

The operation of the latent heat accumulation system having the ice transferring mechanism according to the third embodiment will now be described.

When the antifreezing liquid pump 407 of the antifreezing liquid circulation system is driven, the antifreezing liquid is jetted downward within the ice-producing column 401 from the antifreezing liquid nozzle 402 provided at the top portion 401a of the ice-producing column 401. On the other hand, when the transfer pump 416 of the water circulation system is driven, the water pressurized by the transfer pump 416 flows into the top portion of the ice-producing column 401 from the water nozzle 404. Upon the activation of the antifreezing pump 407 and transfer pump 416, the pressurized water along with the antifreezing liquid flows down in the ice-producing column 401. In the ice-producing column 401, the water is cooled by direct contact with the low-temperature antifreezing liquid. Thus, ice similar to frazil ice, observed in rivers and lakes in North America and Europe, is produced. The frazil ice is a single crystal of ice having a thin, disk-like shape with a diameter of several millimeters.

The produced fine ice particles flow down along with the surrounding water stream. In this case, the antifreezing liquid with a high specific gravity descends more quickly than the surrounding water stream and reaches the antifreezing liquid recovery section 405 provided below. The descending antifreezing liquid joins the antifreezing liquid 406 staying in the antifreezing liquid recovery section 405. The water stream including ice cannot descend below the antifreezing liquid 406. Accordingly, the direction of the flowing water and ice changes at the interface of the antifreezing liquid and the water and ice in a communication section 401a between the ice-producing column 401 and upward pipe 413. Then, the water and ice flow through the upward pipe 413.

The water including fine ice particles, which has entered the upward pipe, rises slowly in the upward pipe 413. In this case, the antifreezing liquid mixed in the water cannot move along with the water due to the effect of gravitation, and the separation of the antifreezing liquid is accelerated. Water alone of the two-phase stream of ice and water, which has risen in the upward pipe 413, is extracted by the water extraction device 414 provided at a downstream-side horizontal portion. As a result, the ice filling rate of the ice/water two-phase stream to the transfer pipe 421 is increased by the water extraction device 414.

Since the flow rate of the two-phase stream passing through the transfer pipe 421 is reduced, there is a concern about a decrease in cooling performance. However, since the heat used for cooling is mainly the latent heat of the ice, the cooling performance is not greatly decreased.

When the ice/water two-phase stream has reached from the upward pipe 413 to the latent heat accumulation tank 420 via the transfer pipe 421, the two-phase stream falls by gravitation from the open end portion 421a of transfer pipe 421 into the upper space of the tank 420. Thus, sherbet-state ice is successively poured on the ice stored in the tank 420. At this time, the ice stored in the latent heat accumulation tank 420 and newly poured sherbet-state ice are compressed. Thereby, the ice filling rate in the tank 420 is increased.

The sherbet-state ice staying in the upper part of the latent heat accumulation tank 420 is floating on the water. Since the water is guided to the transfer pump 416 via the return pipe 422 from the water port 420a formed at a lower portion of the tank 420, the level of water in the latent heat accumulation tank 420 having the ice transferring mechanism is kept constant.

Although not shown, means for storing and recovering the antifreezing liquid, which is flown out of the ice-producing section 419 by the water stream, is provided at bottom portions of the transfer pipe 421 and latent heat accumulation tank 420. Thus, the antifreezing liquid is periodically recovered.

According to the third embodiment of the invention, the antifreezing liquid and water are injected from the antifreezing liquid nozzle 402 and water nozzle 404 into the top portion 401a of ice-producing column 401. Thereby, fine ice particles are produced. The ice particles, along with the water and antifreezing liquid, flow down in the ice-producing column 401. The antifreezing liquid alone is recovered by the antifreezing liquid recovery section 405 provided at the bottom portion of the ice-producing column 401. The ice particles and water rise in the upward pipe 413. The partial water alone of the ice/water two-phase stream, which has risen, is extracted by the water extraction device 414. Then, the two-phase stream is transferred via the transfer pipe 421 to the latent heat accumulation tank 420 situated apart from the ice-producing column 401.

Accordingly, in the ice-producing column 401, the ice particles can be efficiently produced by direct contact between the water and antifreezing liquid. In addition, the antifreezing liquid can be efficiently recovered to the antifreezing liquid recovery section 405 on the basis of the difference in specific gravity between the water and antifreezing liquid.

The direction of the water/ice stream changes towards the upward pipe 413 at the interface of the water/ice stream and the antifreezing liquid staying in the antifreezing liquid recovery section 405. In the upward pipe 413, too, the antifreezing liquid is separated from the water by gravitation and recovered to the antifreezing liquid recovery section 405. Thus, the amount of the antifreezing liquid, which flows to the downstream side from the upward pipe 413, is limited to a minimum, and the ice production can be stably continued. In addition, since the pulverizer 424 is driven by the driver 424a, the outflow of the antifreezing liquid from the ice-producing section 419 is prevented more surely.

After the water of the ice/water two-phase stream, which has passed through the upward pipe 413, is extracted by the water extraction device 414, the ice/water two-phase stream is transferred through the transfer pipe 421 and stored in the latent heat accumulation tank 420. At this time, the ice/water two-phase stream is transferred through the sealed and heat-insulated pipe. Thus, even if the latent heat accumulation tank 420 is situated far away from the ice-producing tank 419 or the flow rate of the two-phase stream is reduced, the amount of cold heat is little decreased. Furthermore, the ice-producing column 401, antifreezing liquid recovery section 405, upward pipe 413 and transfer pipe 421 for the ice/water two-phase stream are all connected hermetically, and the ice/water two-phase stream is continuously fed by the transfer pump 416. Thus, a regular pipe member can be used for the transfer pipe 421 up to the open end thereof.

The two-phase stream, which has reached the heat accumulation tank 420 via the transfer pipe 421, falls into the space of the tank 420 from the open end portion 421a of the transfer pipe 421 situated above the latent heat accumulation tank 420. The sherbet-state ice is compressed by gravitation and the buoyancy of ice, and the ice-filling rate in the latent heat accumulation tank 420 can be increased.

Besides, after the water is extracted by the water extraction device 414 provided on the downstream side of the upward pipe 413, the ice filling rate of the two-phase stream is measured by the ice filling rate measuring device 417. Based on the measurement signal from the measuring device 417, the flow rate of water extracted by the control valve 414 is controlled by the pressure reducing valve 418. Thus, the diameter of the water feed pipe and the amount of circulation water in the heat accumulation system can be decreased, and the manufacturing cost can be reduced.

Figure 29:
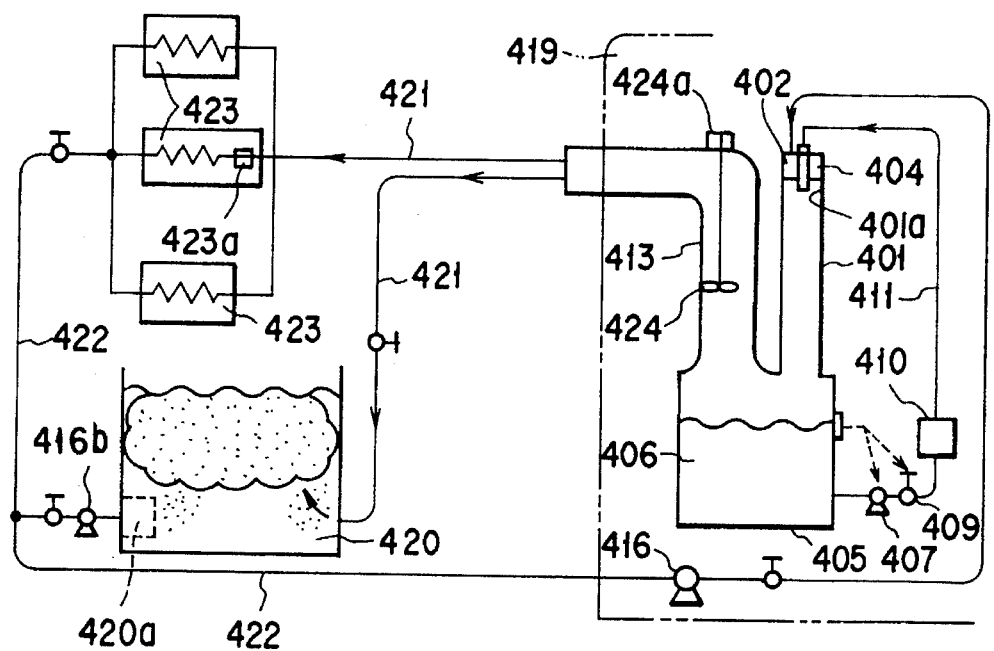
FIG. 29 shows a fourth embodiment of a latent heat accumulation system having an ice transferring mechanism according to the invention.

FIG. 29 shows a fourth embodiment of a latent heat accumulation system having an ice transferring mechanism according to the invention. In the system of the fourth embodiment, the water extraction device and extracted water pipe system are removed from the construction shown in FIG. 28. The system of the fourth embodiment includes an ice-producing section 419 in which an ice pulverizer 424 is situated within an upward pipe 413. In the system of the fourth embodiment, part of the ice/water two-phase stream produced by the ice-producing section 419 is supplied to a bottom portion of a latent heat accumulation tank 420 via a transfer pipe 421. In the system of the fourth embodiment, the remaining portion of the two-phase stream produced by the ice-producing section 419 is transferred to heat exchangers 423 for utilization of cold heat. After the cold heat has been used, the water of the ice/water two-phase stream is let to flow through a return pipe 422 and to join water drained from the tank 420 through a water port 420a by a transfer pump 416b. The confluent water stream is guided to a transfer pump 416 provided on the ice-producing section (419) side.

According to the latent heat accumulation system with the ice-transferring mechanism having the above structure, a large-scale latent heat accumulation tank 420 is not required and the heat accumulation effect can be exhibited only by providing the heat exchangers 423 with a small ice reservoir 423a. In addition, the ice-pulverizer 424 is driven by driver 424a so that the outflow of the antifreezing liquid from the ice-producing unit 419 can be further reduced.

Needless to say, in the case where the ice-producing section 419 is situated far away from the heat exchangers 423, a water extraction device can also be used, like the third embodiment.

As regards the third and fourth embodiments, descriptions were given of the structure for guiding the two-phase stream from the ice-producing section 419, which comprises the ice-producing column 401, antifreezing liquid recovery section 405, upward pipe 413 and water extraction device 414, to the latent heat accumulation tank 420 or heat exchangers 423. However, it is possible to provide a plurality of ice-producing sections 419, combine ice/water two-phase streams produced by the respective ice-producing sections 419 by means of a header, and then guide the combined stream to a specified latent heat accumulation tank or a specified heat exchanger.

Figure 30:
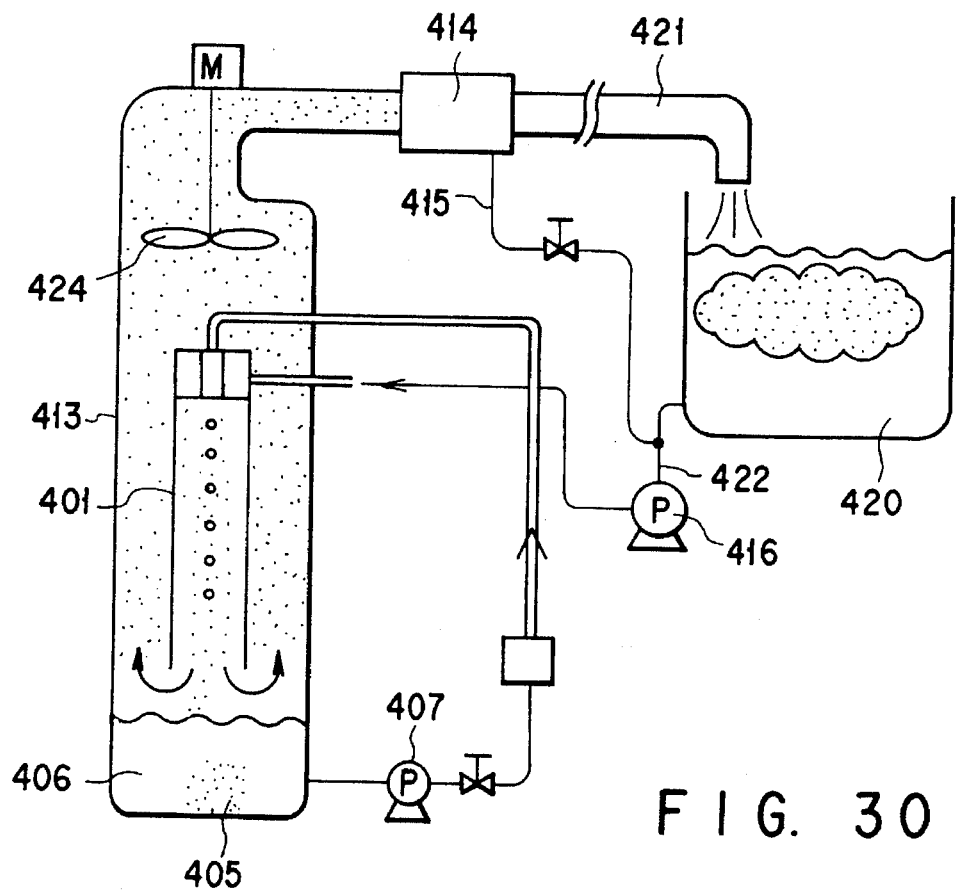
FIG. 30 shows a fifth embodiment of a latent heat accumulation system having an ice transferring mechanism according to the invention.

FIG. 30 shows a fifth embodiment of a latent heat accumulation system having an ice transferring mechanism according to the invention. In FIG. 30, the same structural elements as shown in FIG. 28 are denoted by like reference numerals and a description thereof is omitted.

In the fifth embodiment, an antifreezing liquid recovery section 405 is formed in a bottom portion of a vertically situated upward pipe 13, as shown in FIG. 30. An ice-producing column 401 is vertically provided within the upward pipe 413, with an open end portion of the ice-producing column 401 directed to the antifreezing liquid recovery section 405. An antifreezing liquid circulation system is provided between a top portion of the ice-producing column 401 and the antifreezing liquid recovery section 405. The antifreezing liquid circulation system pressurizes an antifreezing liquid 406 recovered in the recovery section 405 by means of an antifreezing liquid pump 407 and injects the pressurized antifreezing liquid 406 into the ice-producing column 401.

A pulverizer 424 for pulverizing ice, in particular, a flock ice particles, rising in the upward pipe 413, is provided within the upward pipe 413. A water extraction device 414 is provided on the downstream side of the pulverizer 424.

A transfer pipe 421 is hermetically connected to the upward pipe 413 provided on the rear stage of the water extraction device 414. Thus, the ice/water two-phase stream fed through the transfer pipe 421 can be supplied to the latent heat accumulation tank 420 situated remote from the ice-producing section.

Besides, the latent heat accumulation tank 420 is provided with a water circulation system. In the water circulation system, water drained from the water port through a return pipe 422 is pressurized by a transfer pump 416 and fed into the ice-producing column 401 from the top portion thereof. Further, in the water circulation system, the water extracted from the water extraction device 414 via an extracted water pipe 415 is let to flow into the return pipe 422.

According to the latent heat accumulation system with the ice-transferring mechanism having the above structure, the same advantages as in the second and third embodiments can be obtained. In addition, since the ice-producing column 401 is provided in the upward pipe 413, the size of the ice-producing section can be reduced and the space for installation made smaller.

As has been described above, according to the present invention, there is provided a latent heat accumulation system having an ice-transferring mechanism including a highly reliable, highly efficient latent heat transfer system capable of smoothly feeding sherbet-state ice into a pipe and transferring the ice by means of a pump.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A latent heat accumulation system having a transfer mechanism, said system comprising:

a production tank in which a first fluid is put in direct contact with a second fluid, which does not combine with the first fluid, has a specific gravity greater than that of the first fluid and is cooled to a preset temperature level, thus producing a solid phase material of the first fluid;

a recovery section, formed at a lower part of said production tank, for recovering the second fluid descending within the production tank;

an upward pipe, connected to said production tank, for guiding upward a two-phase stream of said first fluid and said solid phase material within the production tank;

a transfer pipe, connected to said upward pipe, for transferring said two-phase stream to a specified place;

a reservoir tank for storing the two-phase stream transferred via said transfer pipe;

a first fluid circulation system for draining the first fluid from the reservoir tank and introducing the drained first fluid into the production tank; and a second fluid circulation system for cooling the second fluid recovered by said recovery section and feeding the cooled second fluid into the production tank for bringing the second fluid into direct contact with the first fluid.

2. The system according to claim 1, wherein said production tank, said recovery section, said upward pipe and said transfer pipe are hermetically connected.

3. The system according to claim 1, wherein said production tank includes at an upper part thereof a direct contact section for direct contact between the first fluid and the second fluid, and at a lower part thereof a coupling section for coupling with a lower opening portion of the upward pipe.

4. The system according to claim 1, wherein said production tank is situated within said upward pipe.

5. The system according to claim 1, wherein said production tank includes a nozzle for injecting the second fluid into the first fluid within the production tank, thereby to produce said solid phase material, said nozzle being situated in a preset position at a predetermined distance above the interface between the first fluid and the second fluid within the production tank so as to obtain a maximum heat exchange efficiency between the first fluid and the second fluid.

6. The system according to claim 1, further comprising a first fluid extraction section for extracting the first fluid alone from the upward pipe and introducing the extracted first fluid into the first fluid circulation system.

7. The system according to claim 1, wherein said first fluid circulation system includes a pressurizing pump for pressurizing the extracted first fluid.

8. The system according to claim 1, further comprising pulverizing means for pulverizing said solid state material, said pulverizing means being situated within said upward pipe.

9. The system according to claim 1, wherein said second fluid circulation system includes a pressurizing pump for pressurizing the recovered second fluid.

10. The system according to claim 1, further comprising a heat exchange system for draining the first fluid from said reservoir tank and utilizing the drained first fluid as a heat exchange medium.

11. The system according to claim 10, wherein said heat exchange system comprises a heat exchanger into which the first fluid is supplied from the reservoir tank as a heat exchange medium, and means for draining the first fluid from the reservoir tank, introducing the drained first fluid into the heat exchanger, and returning the first fluid, which has flowed out of the heat exchanger, to the reservoir tank.

* * * * *

UNITED STATES PATENT AND TRADEMARK OFFICE
CERTIFICATE OF CORRECTION

PATENT NO. : 5,598,712
DATED : February 4, 1997
INVENTOR(S) : Yutaka WATANABE, et al.

It is certified that error appears in the above-indentified patent and that said Letters Patent is hereby corrected as shown below:

On the title page, the Foreign Application Priority Data should read:

--Feb. 28, 1992 [JP] Japan..... 4-043720
  Mar.  5, 1992 [JP] Japan..... 4-048153
  Apr.  1, 1992 [JP] Japan..... 4-078112--

Signed and Sealed this

Tenth Day of June, 1997

Attest:

BRUCE LEHMAN

Attesting Officer

Commissioner of Patents and Trademarks